(12) United States Patent
Tomeba et al.

(10) Patent No.: US 9,178,598 B2
(45) Date of Patent: Nov. 3, 2015

(54) WIRELESS TRANSMISSION APPARATUS, WIRELESS RECEPTION APPARATUS, WIRELESS COMMUNICATION SYSTEM AND INTEGRATED CIRCUIT

(75) Inventors: Hiromichi Tomeba, Osaka (JP); Shimpei To, Osaka (JP); Takashi Onodera, Osaka (JP); Hiroshi Nakano, Osaka (JP); Alvaro Ruiz Delgado, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 275 days.

(21) Appl. No.: 13/884,015

(22) PCT Filed: Aug. 29, 2011

(86) PCT No.: PCT/JP2011/069474
§ 371 (c)(1),
(2), (4) Date: May 8, 2013

(87) PCT Pub. No.: WO2012/063538
PCT Pub. Date: May 18, 2012

(65) Prior Publication Data
US 2013/0242849 A1  Sep. 19, 2013

(30) Foreign Application Priority Data
Nov. 9, 2010 (JP) .................................. 2010-250636

(51) Int. Cl.
*H04W 4/00* (2009.01)
*H04B 7/06* (2006.01)
*H04B 7/04* (2006.01)

(52) U.S. Cl.
CPC ............ *H04B 7/0697* (2013.01); *H04B 7/0478* (2013.01)

(58) Field of Classification Search
CPC ........................... H04B 7/0478; H04B 7/0697
USPC .......... 370/328, 329; 375/267, 259, 260, 346, 375/341, 347
See application file for complete search history.

(56) References Cited

U.S. PATENT DOCUMENTS 6,314,147 B1 * 11/2001 Liang .................. H04B 7/0854
375/346
7,146,315 B2 * 12/2006 Balan ...................... G10L 25/78
379/406.04

(Continued)

OTHER PUBLICATIONS

Official Communication issued in International Patent Application No. PCT/JP2011/069474, mailed on Oct. 18, 2011.

(Continued)

*Primary Examiner* — Chuong T Ho
(74) *Attorney, Agent, or Firm* — Keating & Bennett, LLP

(57) ABSTRACT

In a codebook-based closed loop type MIMO, improvement for complexity in a mobile station apparatus, and reduction of amount of overhead needed for notification from the mobile station apparatus should be provided. A wireless transmission apparatus that includes a plurality of transmission antennas, performs precoding on a data signal for each of a plurality of reception apparatuses and spatially multiplexes and transmits the signal after the precoding. The wireless transmission apparatus performs sharing a codebook describing a plurality of linear filters associated with each other is shared with the each reception apparatus, and precoding on the data signal for each reception apparatus, based on a first linear filter that is extracted from the codebook in each reception apparatus based on the association and that is notified from each reception apparatus.

17 Claims, 16 Drawing Sheets

(56) References Cited

U.S. PATENT DOCUMENTS

| | | | |
|---|---|---|---|
| 7,336,599 B2 * | 2/2008 | Hwang | H04B 1/71052 370/208 |
| 7,340,016 B2 * | 3/2008 | Hui | H04L 1/0618 375/347 |
| 7,961,807 B2 * | 6/2011 | Kotecha et al. | 375/267 |
| 8,385,395 B2 * | 2/2013 | Dietl et al. | 375/227 |
| 8,509,339 B2 * | 8/2013 | Kotecha et al. | 375/267 |
| 2004/0052236 A1 * | 3/2004 | Hwang | H04B 1/71052 370/342 |
| 2004/0247055 A1 * | 12/2004 | Hui | H04L 1/0618 375/341 |
| 2007/0201548 A1 * | 8/2007 | Badri-Hoeher | H04L 25/03267 375/233 |
| 2008/0227495 A1 * | 9/2008 | Kotecha et al. | 455/562.1 |
| 2008/0260051 A1 * | 10/2008 | Boccardi | H04B 7/0452 375/259 |
| 2010/0284483 A1 * | 11/2010 | Jongren | 375/267 |
| 2010/0322176 A1 * | 12/2010 | Chen | H04B 7/024 370/329 |
| 2011/0149765 A1 * | 6/2011 | Gorokhov | H04L 1/0026 370/252 |
| 2011/0292926 A1 * | 12/2011 | Clerckx et al. | 370/342 |
| 2012/0039419 A1 * | 2/2012 | Maddah-Ali | H04L 25/03343 375/340 |
| 2012/0114064 A1 * | 5/2012 | Kotecha et al. | 375/295 |
| 2013/0177094 A1 * | 7/2013 | Jongren | 375/267 |
| 2013/0223555 A1 * | 8/2013 | Sheng | H04B 7/0452 375/267 |
| 2013/0286949 A1 * | 10/2013 | Tomeba | H04B 7/0452 370/328 |
| 2014/0050275 A1 * | 2/2014 | Kotecha et al. | 375/267 |
| 2015/0017989 A1 * | 1/2015 | Brisebois | 455/436 |

OTHER PUBLICATIONS

NTT DOCOMO, "Performance of DL MU-MIMO Based on Implicit Feedback Scheme in LTE-Advanced," 3GPP TSG RAN WG1 Meeting #59bis, R1-100501, Jan. 18-22, 2010, Valencia, Spain, pp. 1-9.

Alcatel-Lucent, "UE PMI Feedback Signalling for User Pairing/Coordination," 3GPP TSG RAN WG1 #55bis Meeting, R1-090051, Jan. 12-16, 2009, Ljubljana, Slovenia, pp. 1-3.

Pantech, "Companion Subset Based PMI Feedback for Rank 1/2 MIMO Transmission," 3GPP TSG RAN Working Group 1 Meeting #61bis, R1-103617, Jun. 28-Jul. 2, 2010, Dresden, Germany, pp. 1-4.

"3rd Generation Partnership Project; Technical Specification Group Radio Access Network; Evolved Universal Terrestrial Radio Access (E-UTRA) Physical Channels and Modulation (Release 8)," 3GPP TS 36.211, V8.9.0, Dec. 2009, 83 pages.

Alcatel-Lucent et al., "Way Forward on 8Tx Codebook for Rel.10 DL MIMO," 3GPP TSG RAN WG1 62, R1-105011, Aug. 23-27, 2010, Madrid, Spain, 6 pages.

Texas Instruments, "Dual-Stage Codebook Proposal for Rel. 10 DL MIMO," 3GPP TSG RAN WG1 62, R1-104471, Aug. 23-27, 2010, Madrid, Spain, pp. 1-6.

Pantech, "On the Two Stage 8 Tx Codebook," 3GPP TSG-RAN WG1 #62, R1-104635, Aug. 23-27, 2010, Madrid, Spain, pp. 1-2.

* cited by examiner

| | |
|---|---|
| $W_1$ | $C_1 = \{c_{1,1}, c_{1,2}, \ldots, c_{1,16}\}$<br><br>$c_{1,k} = \begin{pmatrix} X_{k-1} & 0_4 \\ 0_4 & X_{k-1} \end{pmatrix}$, $0_4 : 4 \times 4$ zero matrix<br><br>$X_k = (b_{2k \bmod 32} \quad b_{(2k+1) \bmod 32} \quad b_{(2k+2) \bmod 32} \quad b_{(2k+3) \bmod 32})$<br><br>$b_m = (1 \quad e^{j\frac{2\pi m}{32}} \quad e^{j\frac{4\pi m}{32}} \quad e^{j\frac{6\pi m}{32}})^T$ |
| $W_2$ | $C_2 = \{c_{2,1}, c_{2,2}, \ldots, c_{2,16}\}$<br><br>$c_{2,k} = \sqrt{\dfrac{1}{2}} \begin{pmatrix} e_{\lfloor (k-1)/4 \rfloor} \\ j^{(k-1) \bmod 4} e_{\lfloor (k-1)/4 \rfloor} \end{pmatrix}$<br><br>$(e_0 \quad e_1 \quad e_2 \quad e_3) = \begin{pmatrix} 1 & 0 & 0 & 0 \\ 0 & 1 & 0 & 0 \\ 0 & 0 & 1 & 0 \\ 0 & 0 & 0 & 1 \end{pmatrix}$ |

FIG. 4

| | | FIRST CATEGORIZATION | | | |
|---|---|---|---|---|---|
| 15 | 16 | 1 | 2 | 3 | |
| 3 | 4 | 5 | 6 | 7 | |
| 7 | 8 | 9 | 10 | 11 | |
| 11 | 12 | 13 | 14 | 15 | |

FIG. 6

| SECOND CATEGORIZATION | | | |
|---|---|---|---|
| 1 | 5 | 9 | 13 |
| 2 | 6 | 10 | 14 |
| 3 | 7 | 11 | 15 |
| 4 | 8 | 12 | 16 |

FIG. 7

| INDEX OF LINEAR FILTER | VALUE OF LINEAR FILTER |
|---|---|
| 1 | $[1\ -1\ -1\ -1]^T$ |
| 2 | $[1\ -j\ -1\ j]^T$ |
| 3 | $[1\ 1\ -1\ 1]^T$ |
| 4 | $[1\ j\ 1\ -j]^T$ |
| 5 | $[1\ (-1-j)/\sqrt{2}\ -j\ (1-j)/\sqrt{2}\ ]^T$ |
| 6 | $[1\ (1-j)/\sqrt{2}\ j\ (-1-j)/\sqrt{2}\ ]^T$ |
| 7 | $[1\ (1+j)/\sqrt{2}\ -j\ (-1+j)/\sqrt{2}\ ]^T$ |
| 8 | $[1\ (-1+j)/\sqrt{2}\ j\ (1+j)/\sqrt{2}\ ]^T$ |
| 9 | $[1\ -1\ 1\ 1]^T$ |
| 10 | $[1\ -j\ -1\ -j]^T$ |
| 11 | $[1\ 1\ 1\ -1]^T$ |
| 12 | $[1\ j\ -1\ j]^T$ |
| 13 | $[1\ -1\ -1\ 1]^T$ |
| 14 | $[1\ -1\ 1\ -1]^T$ |
| 15 | $[1\ 1\ -1\ -1]^T$ |
| 16 | $[1\ 1\ 1\ 1]^T$ |

FIG. 9

CATEGORIZATION (THIRD CATEGORIZATION) RELATING TO
EXTRACTION OF BPMI IN SECOND CODEBOOK

| INDEX OF DESIRED LINEAR FILTER | INDEX OF LINEAR FILTER THAT IS CANDIDATE OF BPMI |
|---|---|
| 1 | 2, 3, 4, 9, 11 |
| 2 | 1, 3, 4, 10, 12 |
| 3 | 1, 2, 4, 9, 11 |
| 4 | 1, 2, 3, 10, 12 |
| 5 | 6, 7, 8 |
| 6 | 5, 7, 8 |
| 7 | 5, 6, 8 |
| 8 | 5, 6, 7 |
| 9 | 1, 3, 10, 11, 12 |
| 10 | 2, 4, 9, 11, 12 |
| 11 | 1, 3, 9, 10, 12 |
| 12 | 2, 4, 9, 10, 11 |
| 13 | 14, 15, 16 |
| 14 | 13, 15, 16 |
| 15 | 13, 14, 16 |
| 16 | 13, 14, 15 |

FIG. 10

CATEGORIZATION (FOURTH CATEGORIZATION) RELATING TO EXTRACTION OF BPMI IN FIRST CODEBOOK $W_1$

| INDEX OF DESIRED LINEAR FILTER | INDEX OF LINEAR FILTER THAT IS CANDIDATE OF BPMI |
|---|---|
| 1 | 5, 9, 13 |
| 2 | 6, 10, 14 |
| 3 | 7, 11, 15 |
| 4 | 8, 12, 16 |
| 5 | 1, 9, 13 |
| 6 | 2, 10, 14 |
| 7 | 3, 11, 15 |
| 8 | 4, 12, 16 |
| 9 | 1, 5, 13 |
| 10 | 2, 6, 14 |
| 11 | 3, 7, 15 |
| 12 | 4, 8, 16 |
| 13 | 1, 5, 9 |
| 14 | 2, 6, 10 |
| 15 | 3, 7, 11 |
| 16 | 4, 8, 12 |

FIG. 11

CATEGORIZATION (FIFTH CATEGORIZATION) RELATING TO EXTRACTION OF BPMI IN FIRST CODEBOOK $W_2$

| INDEX OF DESIRED LINEAR FILTER | INDEX OF LINEAR FILTER THAT IS CANDIDATE OF BPMI |
|---|---|
| 1 | 3, 7, 11, 15 |
| 2 | 4, 8, 12, 16 |
| 3 | 1, 5, 9, 13 |
| 4 | 2, 6, 10, 14 |
| 5 | 3, 7, 11, 15 |
| 6 | 4, 8, 12, 16 |
| 7 | 1, 5, 9, 13 |
| 8 | 2, 6, 10, 14 |
| 9 | 3, 7, 11, 15 |
| 10 | 4, 8, 12, 16 |
| 11 | 1, 5, 9, 13 |
| 12 | 2, 6, 10, 14 |
| 13 | 3, 7, 11, 15 |
| 14 | 4, 8, 12, 16 |
| 15 | 1, 5, 9, 13 |
| 16 | 2, 6, 10, 14 |

FIG. 12

CATEGORIZATION (SIXTH CATEGORIZATION) RELATING TO EXTRACTION OF BPMI IN FIRST CODEBOOK $W_2$

| INDEX OF DESIRED LINEAR FILTER | INDEX OF LINEAR FILTER THAT IS CANDIDATE OF BPMI |
|---|---|
| 1 | 3, 7, 11, 15, 2, 4 |
| 2 | 4, 8, 12, 16, 1, 3 |
| 3 | 1, 5, 9, 13, 2, 4 |
| 4 | 2, 6, 10, 14, 1, 3 |
| 5 | 3, 7, 11, 15, 6, 8 |
| 6 | 4, 8, 12, 16, 5, 7 |
| 7 | 1, 5, 9, 13, 6, 8 |
| 8 | 2, 6, 10, 14, 5, 7 |
| 9 | 3, 7, 11, 15, 10, 12 |
| 10 | 4, 8, 12, 16, 9, 11 |
| 11 | 1, 5, 9, 13, 10, 12 |
| 12 | 2, 6, 10, 14, 9, 11 |
| 13 | 3, 7, 11, 15, 14, 16 |
| 14 | 4, 8, 12, 16, 13, 15 |
| 15 | 1, 5, 9, 13, 14, 16 |
| 16 | 2, 6, 10, 14, 13, 15 |

FIG. 13

CATEGORIZATION (SEVENTH CATEGORIZATION) ASSOCIATED WITH
INTERFERENCE REDUCTION PROCESSING IN SECOND CODEBOOK

| INDEX OF REFERENCE LINEAR FILTER | INDEX OF LINEAR FILTER WHERE RESIDUAL IUI IS INCREASED | INDEX OF LINEAR FILTER WHERE RESIDUAL IUI IS DECREASED |
|---|---|---|
| 1 | 5, 6, 7, 8, 10, 12, 13, 14, 15, 16 | 2, 3, 4, 9, 11 |
| 2 | 5, 6, 7, 8, 9, 11, 13, 14, 15, 16 | 1, 3, 4, 10, 12 |
| 3 | 5, 6, 7, 8, 10, 12, 13, 14, 15, 16 | 1, 2, 4, 9, 11 |
| 4 | 5, 6, 7, 8, 9, 11, 13, 14, 15, 16 | 1, 2, 3, 10, 12 |
| 5 | 1, 2, 3, 4, 9, 10, 11, 12, 13, 14, 15, 16 | 6, 7, 8 |
| 6 | 1, 2, 3, 4, 9, 10, 11, 12, 13, 14, 15, 16 | 5, 7, 8 |
| 7 | 1, 2, 3, 4, 9, 10, 11, 12, 13, 14, 15, 16 | 5, 6, 8 |
| 8 | 1, 2, 3, 4, 9, 10, 11, 12, 13, 14, 15, 16 | 5, 6, 7 |
| 9 | 2, 4, 5, 6, 7, 8, 13, 14, 15, 16 | 1, 3, 10, 11, 12 |
| 10 | 1, 3, 5, 6, 7, 8, 13, 14, 15, 16 | 2, 4, 9, 11, 12 |
| 11 | 2, 4, 5, 6, 7, 8, 13, 14, 15, 16 | 1, 3, 9, 10, 12 |
| 12 | 1, 3, 5, 6, 7, 8, 13, 14, 15, 16 | 2, 4, 9, 10, 11 |
| 13 | 1, 2, 3, 4, 5, 6, 7, 8, 9, 10, 11, 12, | 14, 15, 16 |
| 14 | 1, 2, 3, 4, 5, 6, 7, 8, 9, 10, 11, 12, | 13, 15, 16 |
| 15 | 1, 2, 3, 4, 5, 6, 7, 8, 9, 10, 11, 12, | 13, 14, 16 |
| 16 | 1, 2, 3, 4, 5, 6, 7, 8, 9, 10, 11, 12, | 13, 14, 15 |

FIG. 16

WIRELESS TRANSMISSION APPARATUS, WIRELESS RECEPTION APPARATUS, WIRELESS COMMUNICATION SYSTEM AND INTEGRATED CIRCUIT

TECHNICAL FIELD

The present invention relates to a mobile communication technology, and more particularly to a technology that reduces, in codebook-based closed loop type MIMO, amount of overhead needed for notification from a mobile station apparatus.

BACKGROUND ART

In Long Term Evolution (LTE) standardized in $3^{rd}$ Generation Partnership Project (3GPP) as the $3.9^{th}$ generation radio transmission scheme, in order for spectrum efficiency to be significantly improved from the $3^{rd}$ generation radio transmission scheme, a Multiple Input Multiple Output (MIMO) technology in which a plurality of transmission/reception antennas are used to perform radio transmission is specified. With a spatial multiplexing (SM) technology that is one of the MIMO technologies, it is possible to realize the enhancement of a transmission rate without increasing a frequency bandwidth. LTE-Advanced (LTE-A) that is an advanced version of LTE is approved as one of the $4^{th}$ generation radio transmission schemes by International Telecommunication Union, Radio communication Sector (ITU-R), and its standardization activity is briskly performed. In LTE-A, in order to achieve a peak transmission rate of 1G bps in a downlink (base station apparatus→mobile station apparatus) transmission, a single user MIMO (SU-MIMO) that can spatially multiplex a maximum of 8 streams is examined. SU-MIMO is MIMO transmission between a base station apparatus having a plurality of transmission antennas and a single mobile station apparatus having a plurality of reception antennas.

The MIMO transmission is broadly divided into closed loop type MIMO transmission that requires channel state information (CSI) in a transmission apparatus and open loop type MIMO transmission that does not require the CSI; it is reported that the closed loop type MIMO can achieve more excellent spectrum efficiency than the open loop type MIMO. However, in a radio communication system based on frequency division duplex (FDD) utilizing different carrier wave frequencies in an uplink and a downlink, in order for the base station apparatus to acquire the CSI, it is necessary to feedback the CSI from the mobile station apparatus, there is a problem that overhead is increased significantly.

Hence, in LTE, as disclosed in non-patent document 1, codebook-based closed loop type MIMO transmission is supported that can significantly reduce the amount of overhead needed for notification of the CSI. In the codebook-based closed loop type MIMO, a codebook describing a plurality of linear filters is previously shared between the base station apparatus and the mobile station apparatus, and the mobile station apparatus extracts the desired transmission filter from the codebook and notifies its number (index) to the base station apparatus. The base station apparatus performs, based on the notified linear filter, precoding on transmission data, and thereafter performs MIMO transmission. Since the CSI is notified based on the codebook, as compared with the method in which the mobile station apparatus notifies the CSI itself, it is possible to significantly reduce the amount of overhead. However, in order for the mobile station apparatus to extract the desired transmission filter, it is necessary to calculate the reception quality (such as a reception signal-to-noise power ratio (reception SNR), a reception signal-to-interference plus noise power ratio (reception SINR) or a communication capacity (capacity) etc. for all the linear filters described in the codebook and to compare the results, the burden of the mobile station apparatus is increased.

On the other hand, LTE supports a multiuser MIMO (MU-MIMO) in which a plurality of mobile station apparatuses connected simultaneously are regarded as an imaginary large-scale antenna array, and in which transmission signals from the base station apparatus to the mobile station apparatuses are spatially multiplexed. This is also realized by the codebook-based. As in the SU-MIMO, in the MU-MIMI, the mobile station apparatus notifies the desired linear filter from the codebook to the base station apparatus, and the base station apparatus determines, based on the linear filters notified from a plurality of mobile station apparatuses, whether to perform the MU-MIMO in which data for a plurality of mobile station apparatuses is spatially multiplexed and transmitted.

However, in the codebook-based MU-MIMI in which the mobile station apparatus does not notify the CSI itself, spatial multiplexing opportunity is not significantly enhanced. Hence, non-patent document 2 and the like discuss a technology called Best companion PMI feedback in which the mobile station apparatus notifies the base station apparatus of not only the desired linear filter but also Best companion PMI representing the best compatible linear filter for spatially multiplexing with the desired linear filter. This is a method in which the base station apparatus acquires the desired linear filters notified from a plurality of mobile station apparatuses and the Best companion PMI, and in which the mobile station apparatuses where the desired linear filter in one is the Best companion PMI in another are spatially multiplexed each other; as compared with the pure codebook-based MU-MIMO, it is possible to enhance the spatial multiplexing. However, in order to notify the Best companion PMI, there is a problem that the amount of overhead is increased.

Hence, non-patent document 3 and the like have recently discussed a technology in which a group of linear filters described in the codebook are categorized (grouped or clustered) based on a certain rule to reduce the amount of overhead need for notifying the Best companion PMI. Non-patent document 3 indicates a method in which, a group of linear filters described in the codebook for four transmission antennas adopted in LTE are divided into four clusters to reduce the amount of overhead need for notifying the Best companion PMI. However, non-patent document 3 targets only the codebook for four transmission antennas described in Table 6.3.4.2.3-2 of non-patent document 4, and does not mention the codebook for 8 transmission antennas that has been determined to be adopted in LTE-A described in non-patent document 5. As compared with the codebook for four transmission antennas, in the codebook for 8 transmission antennas, a significantly large number of linear filters are described, and a large burden is placed on the mobile station apparatus only by extracting the desired linear filter, and thus as compared with the codebook for four transmission antennas, it is important to categorize the codebook.

PRIOR ART DOCUMENT

Non-Patent Documents

Non-patent document 1: 3GPP R1-100501, NTT Docomo, "Performance of DL MU-MIMO based on implicit feedback scheme in LTE-Advanced," January 2010.

Non-patent document 2: 3GPP R1-090051, Alcatel-Lucent, "UE PMI feedback signaling for user pairing/coordination," January 2009.

Non-patent document 3: 3GPP R1-103617, Pantech, "Companion subset based PMI feedback for rank 1/2 MIMO transmission," June 2010.

Non-patent document 4: 3GPP TS36.211, "E-UTRA Physical channels and modulation," Version 8.9.0, December 2009.

Non-patent document 5: 3GPP R1-105011, "Way Forward on 8Tx Codebook for Rel.10 DL MIMO," August 2010.

DISCLOSURE OF THE INVENTION

Problems to be Solved by the Invention

However, in the codebook-based closed loop type MIMO, since the mobile station apparatus extracts the desired linear filter from the group of linear filters described in the codebook, as the size of the codebook is increased, the complexity of the mobile station apparatus is increased. Moreover, although it is possible to improve spectrum efficiency by further notifying a linear filter other than the desired linear filter, the amount of overhead needed for notification from the mobile station apparatus is increased.

The present invention is made in view of the foregoing conditions; an object of the present invention is to provide a wireless transmission apparatus, a wireless reception apparatus, a wireless communication system and an integrated circuit each of which realizes, in the codebook-based closed loop type MIMO, the improvement of the complexity of the mobile station apparatus and the reduction of the amount of overhead needed for notification from the mobile station apparatus.

Means for Solving the Problems (1) To achieve the above object, the present invention performs the following means. Specifically, a wireless transmission apparatus of an embodiment of the present invention includes a plurality of transmission antennas, performs precoding on a data signal for each of a plurality of reception apparatuses, and spatially multiplexes and transmits the signal after the precoding. The wireless transmission apparatus performs sharing a codebook describing a plurality of linear filters associated with each other with the each reception apparatus, and precoding on the data signal for each reception apparatus, based on a first linear filter that is extracted from the codebook in each reception apparatus based on the association and that is notified from each reception apparatus.

Since as described above, the wireless transmission apparatus shares, with each reception apparatus, the codebook describing a plurality of linear filters associated with each other, and performs the precoding on the data signal for the each reception apparatus based on a first linear filter that is extracted from the codebook in the each reception apparatus based on the association and that is notified from the each reception apparatus, it is possible to significantly reduce the amount of computation required when the wireless reception apparatus extracts the desired linear filter. In particular, the size of the codebook prepared for 8 transmission antennas is significantly large as compared with a codebook for 4 transmission antennas and the like whereas 8 transmission antennas are considered to be essential for significantly improving spectrum efficiency, with the result that it is possible to facilitate the significant reduction of the amount of computation while improving spectrum efficiency.

(2) In the wireless transmission apparatus of an embodiment of the present invention, the each linear filter is associated with the others in the codebook based on orthogonality or a correlation value.

Since as described above, the each linear filter is associated with the others in the codebook based on orthogonality or a correlation value, it is possible to significantly reduce the amount of computation required when the wireless reception apparatus extracts the desired linear filter.

(3) In the wireless transmission apparatus of an embodiment of the present invention, the each linear filter is associated with the others in the codebook by a matrix having a row vector formed with information associated with linear filters having a high correlation value and a column vector formed with information associated with linear filters having a low correlation value or no correlation.

Since as described above, the each linear filter is associated with the others in the codebook by the matrix having the row vector formed with information associated with linear filters having a high correlation value and the column vector formed with information associated with linear filters having a low correlation value or no correlation, it is possible to significantly reduce the amount of computation required when the wireless reception apparatus extracts the desired linear filter.

(4) In the wireless transmission apparatus of an embodiment of the present invention, in a plurality of rows and columns of the matrix, information associated with the each linear filter is described.

Since as described above, in a plurality of rows and columns of the matrix, information associated with the each linear filter is described, it is possible to significantly reduce the amount of computation required when the wireless reception apparatus extracts the desired linear filter.

(5) In the wireless transmission apparatus of an embodiment of the present invention, the first linear filter maximizes anyone of a reception signal-to-noise power ratio, a reception signal-to-interference plus noise power ratio and a communication capacity of the reception apparatus.

Since as described above, the first linear filter maximizes any one of the reception signal-to-noise power ratio, the reception signal-to-interference plus noise power ratio and the communication capacity of the reception apparatus, it is possible to enhance the reception quality of the wireless reception apparatus.

(6) In the wireless transmission apparatus of an embodiment of the present invention, based on the association of the plurality of linear filters, a method of the precoding is determined.

Since as described above, based on the association of the plurality of linear filters, the method of the precoding is determined, the wireless transmission apparatus can determine whether the interference reduction is performed based on the linear filter notified from the mobile station apparatus, can flexibly switch the precoding method without significantly increasing the amount of computation, and can facilitate the enhancement of the spectrum efficiency over the entire system.

(7) In the wireless transmission apparatus of an embodiment of the present invention, the precoding is non-linear computation processing including a modulo computation.

Since as described above, the precoding is non-linear computation processing including the modulo computation, the wireless transmission apparatus can determine whether the non-linear computation processing is performed.

(8) a wireless reception apparatus of an embodiment of the present invention includes at least one reception antenna, and receives a spatially multiplexed signal from a wireless transmission apparatus. The wireless reception apparatus performs sharing a codebook describing a plurality of linear filters associated with each other with the wireless transmission apparatus, and extracting a first linear filter from the codebook, based on the association, and notifying the extracted first linear filter to the wireless transmission apparatus.

Since as described above, in the wireless reception apparatus, the codebook describing a plurality of linear filters associated with each other is shared with the wireless transmission apparatus, and, based on the association, the first linear filter is extracted from the codebook, and the extracted first linear filter is notified to the wireless transmission apparatus, it is possible to significantly reduce the amount of computation required when the wireless reception apparatus extracts the desired linear filter. In particular, the size of the codebook prepared for 8 transmission antennas is significantly large as compared with a codebook for 4 transmission antennas and the like whereas 8 transmission antennas are considered to be essential for significantly improving spectrum efficiency, with the result that it is possible to facilitate the significant reduction of the amount of computation while improving spectrum efficiency.

(9) In the wireless reception apparatus of an embodiment of the present invention, the each linear filter is associated with the others in the codebook based on orthogonality or a correlation value.

Since as described above, the each linear filter is associated with the others in the codebook based on the orthogonality or the correlation value, it is possible to significantly reduce the amount of computation required when the wireless reception apparatus extracts the desired linear filter.

(10) In the wireless reception apparatus of an embodiment of the present invention, the each linear filter is associated with the others in the codebook by a matrix having a row vector formed with information associated with linear filters having a high correlation value and a column vector formed with information associated with linear filters having a low correlation value or no correlation.

Since as described above, the each linear filter is associated with the others in the codebook by the matrix having the row vector formed with information associated with linear filters having a high correlation value and the column vector formed with information associated with linear filters having a low correlation value or no correlation, it is possible to significantly reduce the amount of computation required when the wireless reception apparatus extracts the desired linear filter.

(11) In the wireless reception apparatus of an embodiment of the present invention, in a plurality of rows and columns of the matrix, information associated with the each linear filter is described.

Since as described above, in a plurality of rows and columns of the matrix, information associated with the each linear filter is described, it is possible to significantly reduce the amount of computation required when the wireless reception apparatus extracts the desired linear filter.

(12) In the wireless reception apparatus of an embodiment of the present invention, the first linear filter maximizes any one of a reception signal-to-noise power ratio, a reception signal-to-interference plus noise power ratio and a communication capacity of the reception apparatus.

Since as described above, the first linear filter maximizes any one of the reception signal-to-noise power ratio, the reception signal-to-interference plus noise power ratio and the communication capacity of the reception apparatus, it is possible to enhance the reception quality of the wireless reception apparatus.

(13) In the wireless reception apparatus of an embodiment of the present invention, based on the association, a second linear filter associated with the first linear filter is extracted from the codebook, and the first linear filter and the second linear filter are notified to the wireless transmission apparatus.

Since as described above, in the wireless reception apparatus, based on the association, the second linear filter associated with the first linear filter is extracted from the codebook, and the first linear filter and the second linear filter are notified to the wireless transmission apparatus, it is possible to enhance the spatial multiplexing and the like and improve the spectrum efficiency. It is also possible to prevent the complexity of the mobile station apparatus and the increase in the amount of overhead.

(14) In the wireless reception apparatus of an embodiment of the present invention, the first linear filter and the second linear filter are associated with each other based on orthogonality or a correlation value.

Since as described above, the first linear filter and the second linear filter are associated with each other based on orthogonality or a correlation value, it is possible to significantly reduce the amount of computation required when the wireless reception apparatus extracts the desired linear filter.

(15) In the wireless reception apparatus of an embodiment of the present invention, the second linear filter is associated with a plurality of linear filters.

Since as described above, the second linear filter is associated with a plurality of linear filters, it is possible to enhance the spatial multiplexing and the like and improve the spectrum efficiency. It is also possible to prevent the complexity of the mobile station apparatus and the increase in the amount of overhead.

(16) In the wireless reception apparatus of an embodiment of the present invention, reception quality associated with the second linear filter is different from reception quality associated with the first linear filter.

Since as described above, the reception quality associated with the second linear filter is different from the reception quality associated with the first linear filter, the wireless reception apparatus multiplies transmission data for other wireless reception apparatus by the linear filter which minimizes the reception SNR of its station, and thus it is possible to minimize interference power from the other wireless reception apparatus.

(17) In the wireless reception apparatus of an embodiment of the present invention, the second linear filter minimizes anyone of a reception signal-to-noise power ratio, a reception signal-to-interference plus noise power ratio and a communication capacity of the reception apparatus.

Since as described above, the second linear filter minimizes anyone of a reception signal-to-noise power ratio, a reception signal-to-interference plus noise power ratio and a communication capacity of the reception apparatus, the wireless reception apparatus can minimize the interference power from other wireless reception apparatus.

(18) In the wireless reception apparatus of an embodiment of the present invention, the second linear filter has a high correlation value with the first linear filter.

Since as described above, the second linear filter has a high correlation value with the first linear filter, the wireless reception apparatus can minimize the interference power from other wireless reception apparatus.

(19) A wireless communication system of an embodiment of the present invention includes the wireless transmission apparatus described in (1), and the wireless reception apparatus described in (8).

Since as described above, the wireless communication system of an embodiment of the present invention includes the wireless transmission apparatus described in (1) and the wireless reception apparatus described in (8), it is possible to significantly reduce the amount of computation required when the wireless reception apparatus extracts the desired linear filter. In particular, the size of the codebook prepared for 8 transmission antennas is significantly large as compared with a codebook for 4 transmission antennas and the like whereas 8 transmission antennas are considered to be essential for significantly improving spectrum efficiency, with the result that it is possible to facilitate the significant reduction of the amount of computation while improving spectrum efficiency.

(20) an integrated circuit of an embodiment of the present invention is mounted on a wireless transmission apparatus including a plurality of transmission antennas, and makes the wireless transmission apparatus perform a plurality of functions. The integrated circuit makes the wireless transmission apparatus perform a series of functions, which include: a function of performing precoding on a data signal for each of a plurality of reception apparatuses and of spatially multiplexing and transmitting the signal after the precoding; a function of sharing, with each reception apparatus, a codebook describing a plurality of linear filters associated with each other; and a function of performing, based on a first linear filter that is extracted from the codebook in each reception apparatus based on the association and that is notified from each reception apparatus, the precoding on each data signal for each reception apparatus.

Since as described above, the wireless transmission apparatus performs, based on the first linear filter that is extracted from the codebook in each reception apparatus based on the association and that is notified from each reception apparatus, the precoding on the data signal for each reception apparatus, it is possible to significantly reduce the amount of computation required when the wireless reception apparatus extracts the desired linear filter. In particular, the size of the codebook prepared for 8 transmission antennas is significantly large as compared with a codebook for 4 transmission antennas and the like whereas 8 transmission antennas are considered to be essential for significantly improving spectrum efficiency, with the result that it is possible to facilitate the significant reduction of the amount of computation while improving spectrum efficiency.

(21) an integrated circuit of an embodiment of the present invention is mounted on a wireless reception apparatus including at least one reception antenna, and makes the wireless reception apparatus perform a plurality of functions. The integrated circuit makes the wireless reception apparatus perform a series of functions, which include: a function of receiving a spatially multiplexed signal from a wireless transmission apparatus; a function of sharing, with the wireless transmission apparatus, a codebook describing a plurality of linear filters associated with each other; and a function of extracting, based on the association, a first linear filter from the codebook, and of notifying the extracted first linear filter to the wireless transmission apparatus.

Since as described above, the wireless reception apparatus extracts, based on the association, the first linear filter from the codebook, and notifies the extracted first linear filter to the wireless transmission apparatus, it is possible to significantly reduce the amount of computation required when the wireless reception apparatus extracts the desired linear filter. In particular, the size of the codebook prepared for 8 transmission antennas is significantly large as compared with a codebook for 4 transmission antennas and the like whereas 8 transmission antennas are considered to be essential for significantly improving spectrum efficiency, with the result that it is possible to facilitate the significant reduction of the amount of computation while improving spectrum efficiency.

Effect of the Invention

According to the present invention, in the codebook-based closed loop type MIMO, it is possible to efficiently reduce both the complexity of the mobile station apparatus and the amount of overhead needed for notification from the mobile station apparatus without significantly changing the existing system.

BRIEF DESCRIPTION OF THE DRAWINGS

FIG. 4 A table showing, in LTE-A, a codebook of rank 1 transmission in which the base station apparatus has 8 transmission antennas;

FIG. 6 A table (matrix) showing a first categorization illustrating an optimum method of extracting $W_1$ according to the first embodiment of the present invention;

FIG. 7 A table (matrix) showing a second categorization on a method of determining $W_2$ according to the first embodiment of the present invention;

FIG. 9 A table showing, in LTE, the codebook of rank 1 transmission in which the base station apparatus has 4 transmission antennas;

FIG. 10 A table showing categorization on the extraction of the BPMI in a second codebook according to the second embodiment of the present invention;

FIG. 11 A table showing categorization (fourth categorization) on the extraction of the BPMI on the $W_1$ in a first codebook according to the second embodiment of the present invention;

FIG. 12 A table showing categorization (fifth categorization) on the extraction of the BPMI on the $W_2$ in the first codebook according to the second embodiment of the present invention;

FIG. 13 A table showing categorization (sixth categorization) on the extraction of the BPMI on the $W_2$ in the first codebook according to the second embodiment of the present invention;

FIG. 16 A table showing categorization (seventh categorization) associated with the interference reduction processing in the second codebook according to the third embodiment of the present invention.

EMBODIMENTS FOR CARRYING OUT THE INVENTION

First Embodiment

In a first embodiment of the present invention, communication is targeted in which a plurality of mobile station apparatuses (also referred to as a reception apparatus or a mobile terminal), each having $N_r$ reception antennas is connected to a base station apparatus (also referred to as a transmission apparatus) having $N_t$ transmit antennas. MU-MIMO transmission is target in which a maximum U=2 of mobile station apparatuses are spatially multiplexed in the same radio resource. However, since so long as the number satisfying $N_t \geq R \times U$ (where R is a rank number, which will be described later) can be spatially multiplexed, the number of mobile station apparatuses spatially multiplexed in the same radio resource is not limited to two. Although, in the following description, for simplicity, a situation in which only one data stream is communicated in each mobile station apparatus is assumed, it is also possible to simultaneously transmit data streams corresponding to the number of reception antennas included in each mobile station apparatus. The number of reception antennas included in each mobile station apparatus may differ; the number of data streams transmitted to each mobile station apparatus may naturally differ. In the following description, the number of data streams transmitted by the base station apparatus per mobile station apparatus is referred to as a rank number, and, when R data streams are transmitted, an expression that the transmission of rank R is performed is used.

Figure 1:
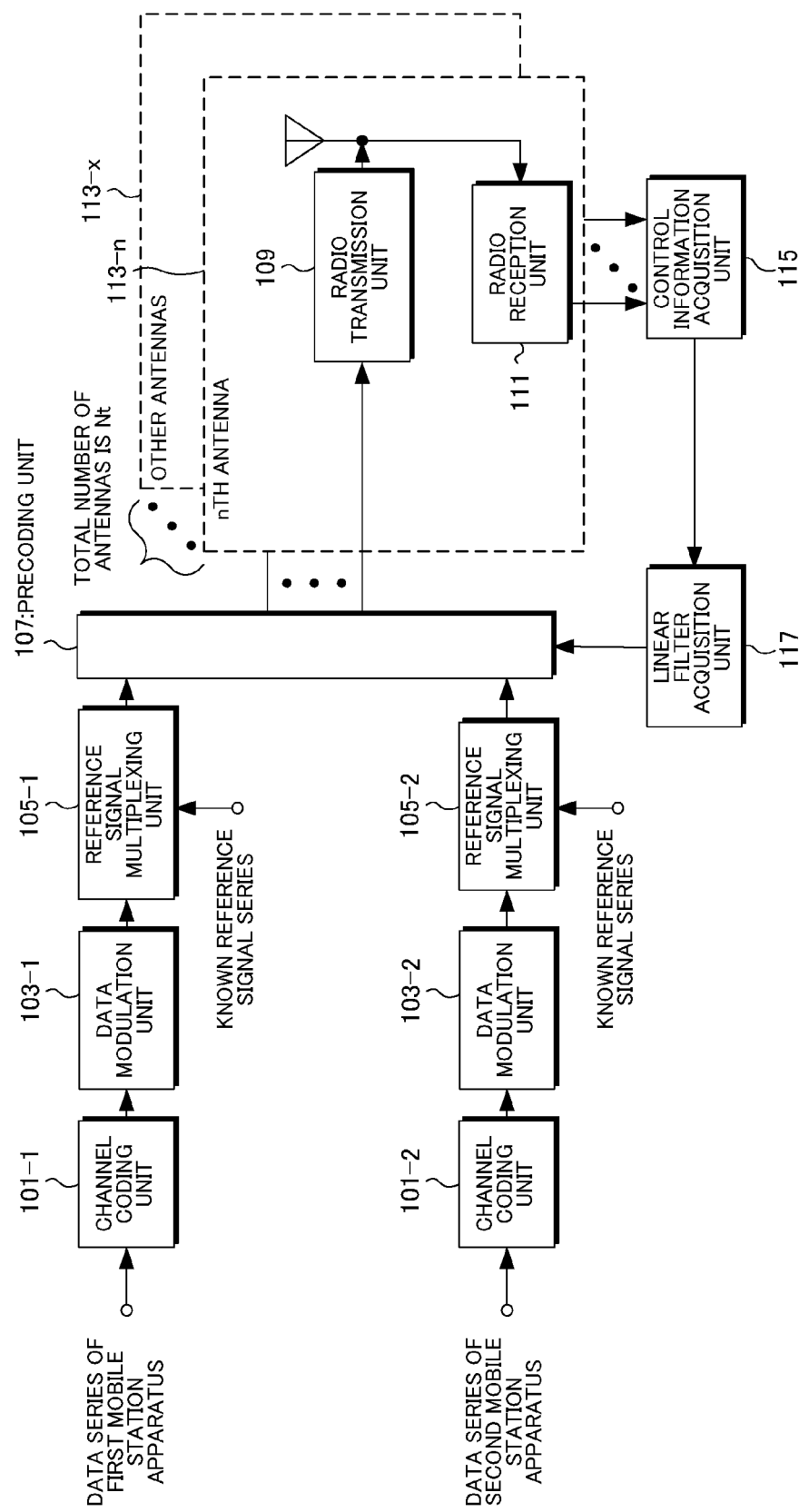
FIG. 1 A block diagram showing a configuration of a base station apparatus according to a first embodiment of the present invention.

FIG. 1 is a block diagram showing the configuration of the base station apparatus according to the first embodiment of the present invention. Transmission data for each mobile station apparatus is input to channel coding units 101-1 and 101-2 and data modulation units 103-1 and 103-2, and channel coding and data modulation are performed. A channel coding rate and a data modulation scheme applied to the transmission data for each mobile station apparatus are assumed to have been already determined based on control information associated with reception quality which is previously notified from each mobile station apparatus. Outputs of the data modulation units 103-1 and 103-2 are input to reference signal multiplexing units 105-1 and 105-2, and known reference signal sequence for performing channel estimation in the mobile station apparatus are multiplexed in the reference signal multiplexing units 105-1 and 105-2. It is assumed that reference signals for the each mobile station apparatus are orthogonally multiplexed such that they can be separated in the mobile station apparatus. In the following description, it is assumed that the reference signals are ideally arranged in an arbitrary radio resource, and that the mobile station apparatus can ideally estimate channel state information of its station with the known reference signal sequence.

Outputs of the reference signal multiplexing units 105-1 and 105-2 are input to a Precoding unit 107. Here, transmission symbols of a first and a second mobile station apparatuses output from the reference signal multiplexing units 105-1 and 105-2 are assumed to be $d_1$ and $d_2$, and a transmission vector d is defined as $d=[d_1, d_2]^T$. $A^T$ represents the transposed matrix of a matrix A. Although an output from a linear filter acquisition unit 117 is input to the Precoding unit 107, the linear filter acquisition unit 117 has acquired, with a method of FIG. 3 to be described later, an desired linear filter of each mobile station apparatus notified from the first and second mobile station apparatuses, and the Precoding unit 107 preforms precoding based on the desired linear filter of each mobile station apparatus.

A method of performing precoding is not limited; in the following description, as an example, a method is targeted in which the base station apparatus calculates a transmission linear filter based on a linear filter notified from the mobile station apparatus, and in which the calculated transmission linear filter is used to preform precoding. Although actually spatially multiplexed mobile station apparatuses are determined based on the desired linear filter notified from each mobile station apparatus and scheduling performed in the base station apparatus, in the following description, a case where the first mobile station apparatus and the second mobile station apparatus are spatially multiplexed is targeted.

In the Precoding unit 107, from the desired linear filter $\{W_1, W_2\}$ notified from the first mobile station apparatus and the second mobile station apparatus, an apparent channel matrix $H_{eff}$ between each mobile station apparatus and the base station apparatus is defined as formula below.

[Formula 1]

$$H_{eff} = \begin{pmatrix} W_1^H \\ W_2^H \end{pmatrix} \quad (1)$$

The apparent channel matrix $H_{eff}$ can be obtained by combining, in a row direction, row vectors obtained by giving Hermitian transpose to the transmission linear filter (here, $W_1$ and $W_2$) notified from each mobile station apparatus. Here, the number of simultaneous spatial multiplexing mobile station apparatuses is assumed to be two; even if the spatial multiplexing number is 3 or more, it is possible to likewise define the channel matrix $H_{eff}$. A linear filter $W_{eff}$ used in the Precoding unit 107 is generated from the channel matrix $H_{eff}$ given by formula (1). The linear filter $W_{eff}$ used in the present embodiment is a matrix that transforms the channel matrix $H_{eff}$ into a diagonal matrix; such a matrix can be generated by determining the generalized inverse matrix of the $H_{eff}$.

[Formula 2]

$$W_{eff} = H_{eff}^+ = H_{eff}^H (H_{eff} H_{eff}^H)^{-1} \quad (2)$$

Where $A^+$ represents the generalized inverse matrix. The linear filter represented by formula (2) is based on Zero-forcing (ZF) criterion to prevent interference between users (IUI) being generated. Instead of the ZF criterion, the linear filter may be generated based on Minimum mean square error (MMSE) criterion that minimizes the mean squared error between the reception signal and the transmission signal, Signal-to-leakage power ratio (SLR) criterion that minimizes interfering power (Leakage power) given to other mobile station apparatuses by the transmission signal for a certain mobile station apparatus, or Signal-to-leakage plus noise power ratio (SLNR) criterion that maximizes a ratio between the desired signal and interfering+reception noise power.

An output of the Precoding unit 107 is generated by multiplying a transmission symbol vector d by the linear filter expressed in formula (2). Power is also normalized so that transmit power required for the transmission of the signal after precoding will not exceed predetermined transmit power. The output of the Precoding unit 107 is input to a radio transmission unit 109 of each transmission antenna. In the radio transmission unit 109, a transmission signal in a baseband is converted into a transmission signal in a radio frequency (RF) band. An output signal of the radio transmission unit 109 is transmitted from each transmission antenna.

Figure 2:
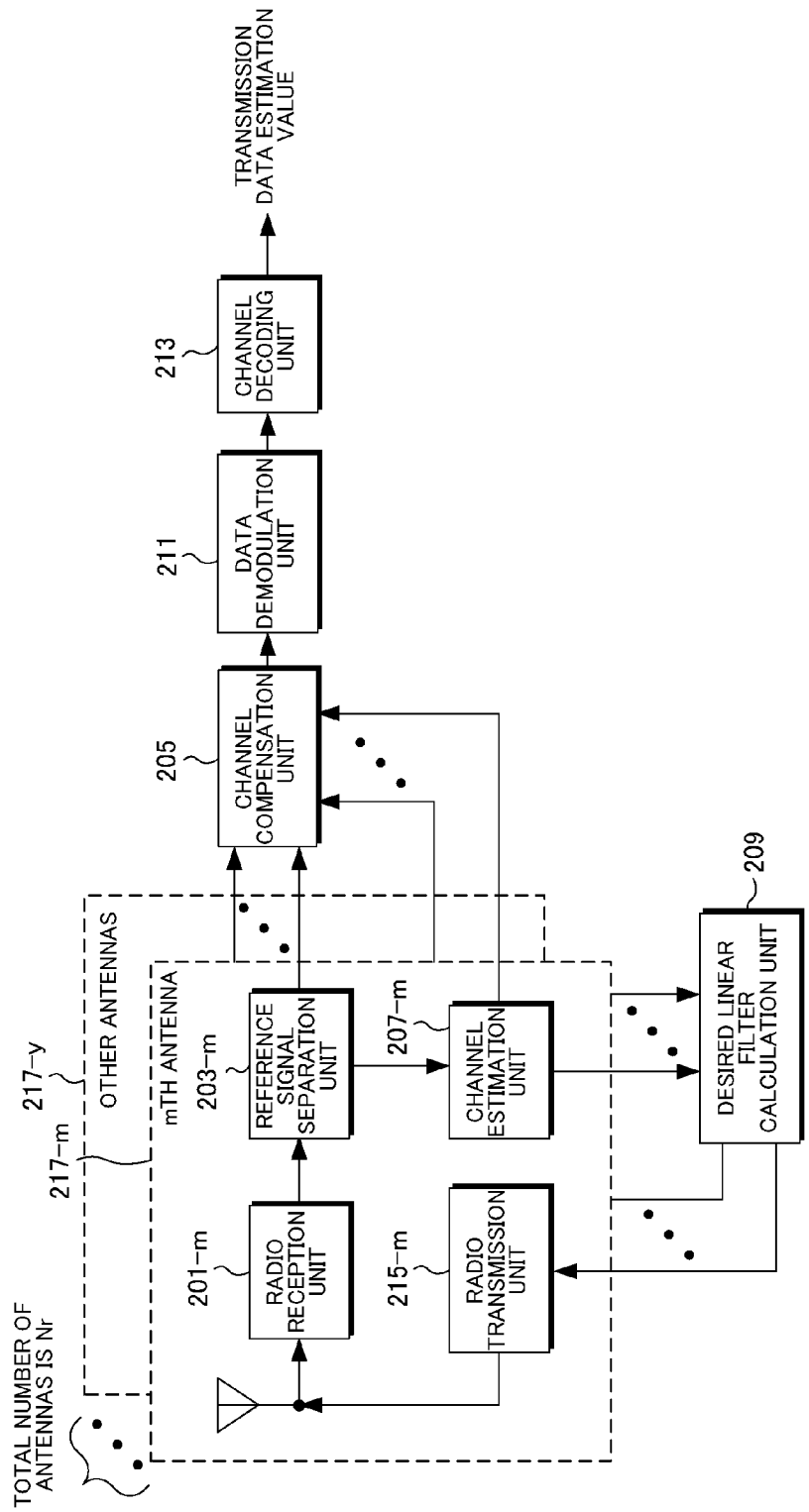
FIG. 2 A block diagram showing a configuration of a mobile station apparatus according to the first embodiment of the present invention.

FIG. 2 is a block diagram showing the configuration of the mobile station apparatus according to the first embodiment of the present invention. In the mobile station apparatus, a signal received by each reception antenna is input to the corresponding radio reception unit 201 (also referred to as the radio reception unit 201 by combining radio reception units 201-1 to 201-$N_r$), and is converted into a signal in the baseband. The converted signal in the baseband is input to a reference signal separation unit 203 (also referred to as the reference signal separation unit 203 by combining the reference signal separation units 203-1 to 203-$N_r$). In the reference signal separation unit 203, the reception signals are separated into a data sequence and a known reference signal sequence; the data sequence is input to a channel compensation unit 205, and the known reference signal sequence is input to a channel estimation unit 207 (also referred to as the channel estimation unit 207 by combining the channel estimation units 207-1 to 207-$N_r$). In the channel estimation unit 207, the input known reference signal sequence is used, and channel estimation is performed. Since the known reference signal sequence for the mobile station apparatuses are transmitted from the base station apparatus so as to be orthogonal to each other, the first mobile station apparatus can estimate a channel matrix $H_1$, and the second mobile station apparatus can estimate a channel matrix $H_2$. The estimated channel matrixes are input to the channel compensation unit 205 and a desired linear filter calculation unit 209.

In the desired linear filter calculation unit 209, based on a channel estimation value and the method of FIG. 3, which will be described later, the desired linear filter is extracted from a predetermined codebook. The extracted linear filter is notified to the base station apparatus. On the other hand, the reception data sequence is input to the channel compensation unit 205, and channel compensation is performed in which a reception filter calculated based on channel estimation information input from the channel estimation unit 207 is multiplied. The method of channel compensation is not limited; for example, if the reception SNR is assumed to be the maximum, based on the desired linear filter $W_U$ notified to the base station apparatus and already estimated channel state information $H_u$, $Wr_u = (H_u \times W_U)^H$ is used as the reception filter, and thus it is possible to maximize the reception SNR.

Depending on signal processing performed in the Precoding unit 107 of the base station apparatus, not only the channel estimation value but also information on the linear filter (for example, a case where in formula (2), instead of a ZF filter, a MMSE filter or the like is used) actually multiplied in the base station apparatus may be necessary for the channel compensation. Here, the base station apparatus preferably transmits not only the known reference signal sequence with which the channel state information is estimated but also the know reference signal sequence with which the linear filter multiplied by the base station apparatus can be estimated by the mobile station apparatus. Preferably, as a specific method, for example, part of the known reference signal sequence is multiplied by the linear filter used in the precoding and is then transmitted. As described above, when the mobile station apparatus can grasp the precoding performed in the base station apparatus, based on the information, may perform the channel compensation. An output of the channel compensation unit 205 is input to a data demodulation unit 211 and a channel decoding unit 213, and is respectively subjected to data demodulation and channel decoding, and thereafter the transmission data for each mobile station apparatus is detected.

Figure 3:
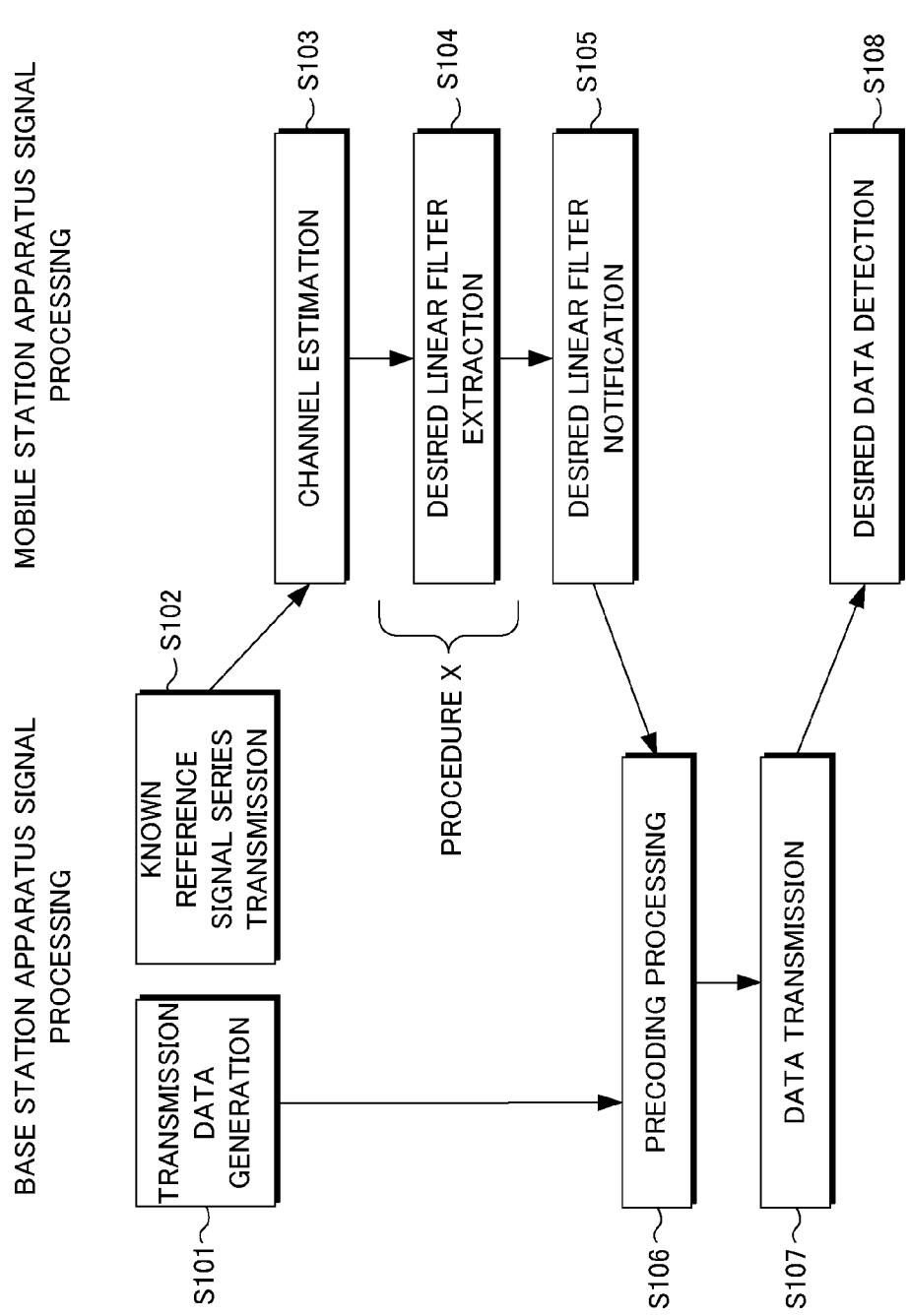
FIG. 3 A flowchart illustrating an outline of signal processing in an entire system according to the first embodiment of the present invention.

FIG. 3 is a flowchart illustrating the outline of signal processing in the entire system according to the first embodiment of the present invention. The base station apparatus first generates the transmission data (step S101), and transmits the known reference signal sequence to a plurality of mobile station apparatuses connected (step S102). Then, based on the received known reference signal sequence, the mobile station apparatus performs the channel estimation (step S103). Based on the estimated channel state information, the mobile station apparatus extracts a linear filter most desirable for its station from the known codebook (step S104), and notifies the number (index) of the linear filter to the base station apparatus (step S105).

The base station apparatus acquires the desired linear filter for each mobile station apparatus, and based on the information, subjects transmission coding (precoding) for the transmission data for each mobile station apparatus (step S106). Data after the precoding is spatially multiplexed with the same radio resource, and is transmitted to a plurality of mobile station apparatuses connected (step S107). In the mobile station apparatus receiving the signal in which the data for a plurality of mobile station apparatuses is spatially multiplexed, based on the channel state information described above and the like, the desired data on its station is detected (step S108).

In the mobile station apparatus, it is necessary to extract the linear filter most desirable for its station from the codebook. The codebook is specified according to the number of transmission antennas included in the base station apparatus and the transmission rank number to each mobile station apparatus. The size of the codebook, that is, the number of linear filters described, is assumed to be C, and the described linear filter is defined as $\{c_j; j=1 \text{ to } C\}$. When it is assumed that the cannel matrix between a uth mobile station apparatus and the base station apparatus is $H_u$, and the linear filter desired by the uth user is $W_u$/the linear filter notified by the uth mobile station apparatus to the base station apparatus satisfies formula below.

[Formula 3]

$$W_u = \underset{c_j; j=1 \sim C}{\mathrm{argmax}} \left( \|H_u c_j\|^2 \right) \quad (3)$$

Here, $\|a\|$ represents the norm operation of a vector a. Since $\arg\max_x (f(x))$ is a function which selects x such that an evaluation function $f(x)$ is the maximum, formula (3) means that $c_j$ maximizing $\|H_u \times c_j\|^2$ is extracted from a linear filter group described in the codebook and is set at the desired linear filter $W_u$ that is notified to the base station apparatus. Maximizing $\|H_u \times c_j\|^2$ means maximizing a reception signal-to-noise power ratio (SNR). Instead of the reception SNR, a reception signal-to-interference+noise power ratio (SINR) or a linear filter that maximizes a communication capacity may be extracted. In general, in order to extract an optimum linear filter, it is necessary to perform the calculation of formula (3) on all linear filters described in the codebook. However, if the size of the codebook is large, the amount of calculation on such calculation is significantly increased, and a larger burden is placed on the mobile station apparatus.

FIG. 4 is a table showing, in the LTE-A, the codebook of rank 1 transmission in which the base station apparatus has 8 transmission antennas. In the codebook (the first codebook) shown in FIG. 4, a codebook describing 16 linear filters is prepared for each of two linear filters $W_1$ and $W_2$. Finally, since the linear filter grasped by the base station apparatus is based on the $W_1$ and $W_2$, 256 linear filters are totally described. Hence, in the first embodiment, a method capable of extracting the desired linear filter with high accuracy without the calculation of formula (3) being performed on all 256 linear filters, that is, a new method on a procedure x in FIG. 3, is disclosed.

Figure 5:
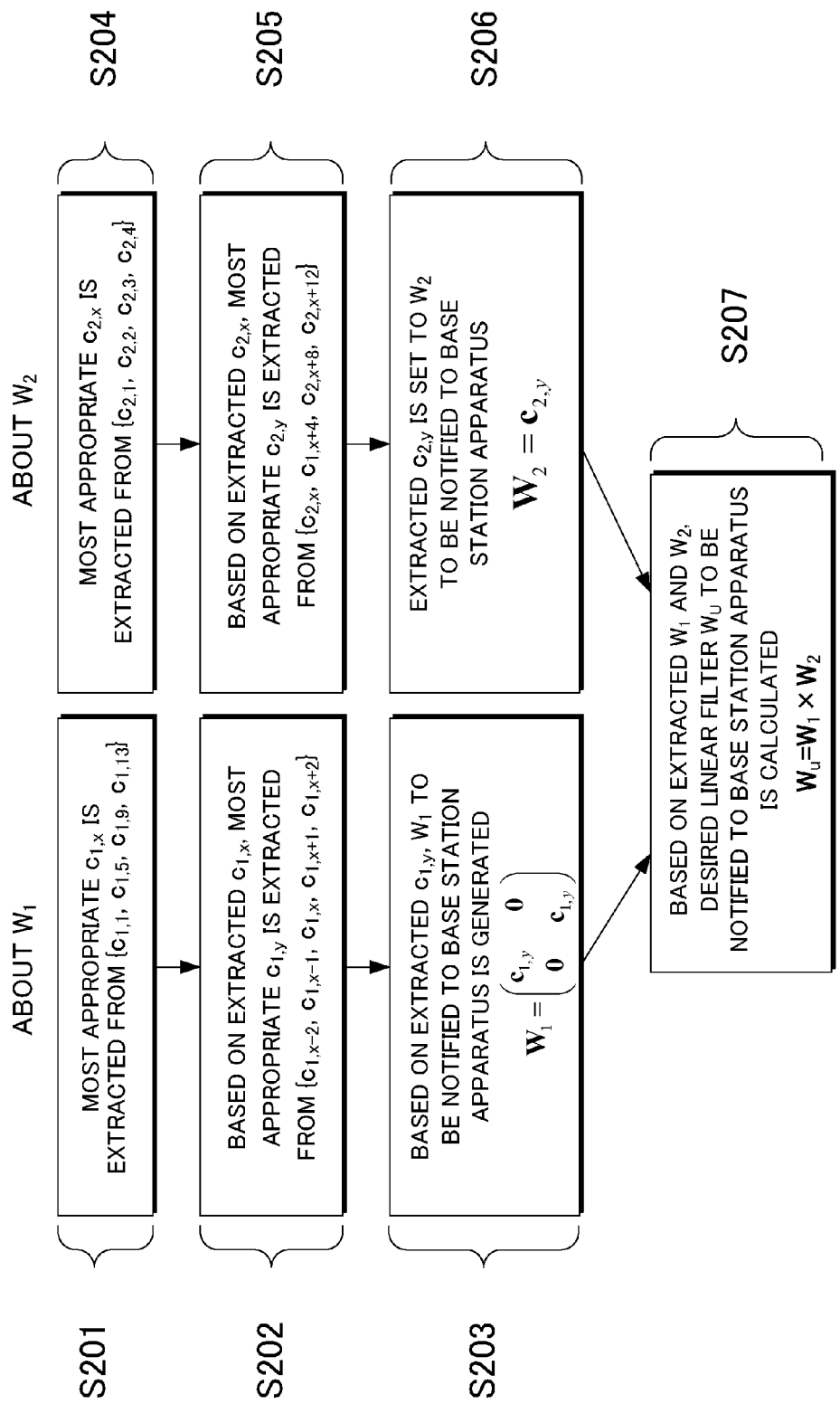
FIG. 5 A flowchart illustrating a method of extracting the desired linear filter according to the first embodiment of the present invention.

FIG. 5 is a flowchart illustrating a method of extracting the desired linear filter according to the first embodiment of the present invention. The first codebook is represented by the matrix product of the two linear filters $W_1$ and $W_2$, the number of $W_1$ exists 16 and the number of $W_2$ exists 16; the desired code is extracted from $C_1=\{c_{1,j}; j=1 \text{ to } 16\}$ for the $W_1$, and the desired code is extracted from $C_2=\{c_{2,j}; j=1 \text{ to } 16\}$ for the $W_2$; they are multiplied and thus the desired linear filter $W_u$ is extracted. A method of determining the $W_1$ will first be described. For the $W_1$, first, among 16 linear filters described, a plurality of linear filters orthogonal to each other are extracted.

As combinations of a plurality of linear filters orthogonal to each other, combinations of $\{c_{1,1}, c_{1,5}, c_{1,9}, c_{1,13}\}$ can be considered. In the mobile station apparatus, among $\{c_{1,1}, c_{1,5}, c_{1,9}, c_{1,13}\}$, the linear filter most applicable to the conditions of formula (3) is extracted (step S201). Here, for the $W_2$, an arbitrary one (for example, $c_{2,1}$) is preferably extracted and used. Then, a plurality of linear filters having a high correlation with the linear filter $c_{1,x}$ selected from $\{c_{1,1}, c_{1,5}, c_{1,9}, c_{1,13}\}$ are extracted (step S202). For example, it can be considered that, for the $c_{1,x}$, five linear filters $\{c_{1,x-2}, c_{1,x-1}, c_{1,x}, c_{1,x+1}, c_{1,x+2}\}$ are extracted. If the previously extracted $c_{1,x}$ is $c_{1,1}$, the optimum linear filter is preferably extracted from $\{c_{1,15}, c_{1,16}, c_{1,1}, c_{1,2}, c_{1,3}\}$. Based on the extracted $c_{1,y}$, the $W_1$ notified to the base station apparatus is generated (step S203). By extracting the $W_1$ as described above, instead of the total of 16 linear filters, the desired linear filter is preferably extracted from 8 linear filters.

FIG. 6 is a table (matrix) showing a first categorization illustrating the optimum method of extracting the $W_1$ according to the first embodiment of the present invention. Each element of the matrix showing the first categorization represents an index for the linear filter related to the $W_1$; for example, a component in the first row and the third column represents $c_{1,1}$. In the column direction of the first categorization, linear filters that have a high correlation with each other or that have a low orthogonality are aligned; in the row direction, linear filters that have a low correlation with each other, that have no correction with each other, or that have a high orthogonality are aligned. For example, $\{c_{1,15}, c_{1,16}, c_{1,1}, c_{1,2}, c_{1,3}\}$ aligned in the first row have a high correlation with each other; $\{c_{1,1}, c_{1,5}, c_{1,9}, c_{1,13}\}$ aligned in the third column have a low correlation with each other.

In the mobile station apparatus, an arbitrary column is extracted from the first categorization, and the optimum linear filter is extracted from the extracted column. Thereafter, the row including the extracted optimum linear filter is extracted, and the optimum linear filter is preferably extracted from the extracted row. In the example described above, the extracted column at the start is the third column, and the subsequently extracted row is the first row. In other words, the mobile station apparatus extracts the linear filter according to the first categorization, and can thereby perform efficient linear filter extraction.

In the first categorization, the column size is 5; this is because the optimum linear filter is extracted from linear filters up to two linear filters before and after the linear filter extracted from an arbitrary column. Here, instead of up to two linear filters before and after the linear filter, the optimum linear filter is assumed to be extracted from a codebook of up to k linear filters ($1 \leq K \leq 8$) before and after the linear filter, and the value of k may be changed according to the transmission quality required by the wireless communication system. If k=2, equivalence to the first categorization described above is made; if k=8, equivalence to a method of extracting the desired code from all conventional linear filters is made. In the first categorization, one linear filter may be described in a plurality of rows or columns.

A method of determining the $W_2$ will then be described. A description will be given again with reference to the flowchart of FIG. 5. For the $W_2$, among 16 linear filters described, a plurality of linear filters orthogonal to each other are extracted at the start. For example, since combinations of $\{c_{2,1}, c_{2,2}, c_{2,3}, c_{2,4}\}$ can be considered, the mobile station apparatus extracts the desired linear filter from $\{c_{2,1}, c_{2,2}, c_{2,3}, c_{2,4}\}$ (step S204). Here, for the $W_1$, an arbitrary one is preferably extracted and used. Then, a plurality of linear filters having a high correlation with the linear filter selected from $\{c_{2,1}, c_{2,2}, c_{2,3}, c_{2,4}\}$ are extracted. For example, if $c_{2,1}$ is selected from $\{c_{2,1}, c_{2,2}, c_{2,3}, c_{2,4}\}$, the optimum linear filter is preferably extracted from $\{c_{2,1}, c_{2,5}, c_{2,9}, c_{2,13}\}$ (step S205). Based on the extracted $c_{2,y}$, the $W_2$ notified to the base station apparatus is generated (step S206). By performing the calculation described above, for the $W_2$, the desired linear filter is also preferably extracted from 8 linear filters.

FIG. 7 is a table (matrix) showing a second categorization on a method of determining the $W_2$ according to the first embodiment of the present invention. For the $W_2$, as in the method of extracting for the $W_1$, it is possible to perform the extraction based on a given categorization. As in the first categorization, the table showing the second categorization is also expressed by a matrix whose elements are indexes of the linear filters on the $W_2$; for example, a component in the first row and the third column represents $c_{2,9}$. In the column direction, linear filters that have a high correlation with each other are aligned; in the row direction, linear filters that have a low correlation with each other or that have no correction with each other are aligned.

In the mobile station apparatus, an arbitrary column is extracted from the second categorization, and the optimum linear filter is extracted from the extracted column. Thereafter, the row including the extracted optimum linear filter is extracted, and the optimum linear filter is preferably extracted from the extracted row. In the example described above, the extracted column is the first column at the start, and the subsequently extracted row is the first row. In other words, the mobile station apparatus extracts the linear filter according to the second categorization, and can also thereby perform efficient linear filter extraction.

With reference back to FIG. 5, the desired linear filter finally notified to the base station apparatus is $W_u (=W_1 \times W_2)$ obtained by multiplying the two linear filters $W_1$ and $W_2$ extracted in the procedure described above (step S207). In the wireless communication system, as the method of notifying the desired linear filter to the base station apparatus by the mobile station apparatus, when the $W_1$ and the $W_2$ are separately notified, the processing in step S207 in the flowchart of FIG. 5 is not necessary in the mobile station apparatus, and is performed by the base station apparatus.

Based on the method described above, in order for the desired linear filter to be extracted from the first codebook where 256 codes are present, the linear filters satisfying formula (3) may be extracted from 16 linear filters, with the result that it is possible to significantly reduce the complexity of the mobile station apparatus. Although in the above description, the number of transmission antennas in the base station apparatus is assumed to be 8, even in a case where the number of transmission antennas is 2 or 4, from a plurality of linear filters described in a predetermined codebook, combinations of linear filters orthogonal to each other and linear filters having a high correlation with each other are extracted, and thus it is possible to perform the same categorization as the first and second categorization, with the result that it is possible to reduce the amount of computation related to linear filter extraction.

In the method described above, each mobile station apparatus extracts the desired linear filter from a predetermined codebook and notifies it to the base station apparatus.

In the present embodiment, a transmission scheme (or an access scheme) is not limited. For example, it is possible to apply it to an orthogonal frequency division multiplexing access (OFDMA) scheme adopted in the downlink transmission of the LTE. In this case, the present invention may be applied to each subcarrier or the present invention may be applied to each resource block where a plurality of subcarriers are summarized. Likewise, it is possible to apply the transmission scheme to a single carrier-based access scheme (for example, a single carrier frequency division multiplexing access (SC-FDMA) scheme or the like); the present invention may be applied to each frequency component; in order for the enhancement of the transmit power to be prevented, the same precoding may be performed over the entire frequency band.

Although in the first embodiment, the description has been given, targeting the MU-MIMO where pieces of data for a plurality of mobile station apparatuses are spatially multiplexed into the same radio resource, each categorization method used in the present embodiment can be applied to the SU-MIMO where spatial multiplexing transmission is performed between the base station apparatus and a single mobile station apparatus. In the present embodiment, it is possible to significantly reduce the amount of computation required when the mobile station apparatus extracts the desired linear filter. In particular, the size of the codebook prepared for 8 transmission antennas is significantly large as compared with a codebook for 4 transmission antennas and the like whereas 8 transmission antennas are considered to be essential for significantly improving spectrum efficiency, with the result that, by the method of the present embodiment, it is possible to facilitate the significant reduction of the amount of computation while improving spectrum efficiency.

Second Embodiment

In the first embodiment, the method of efficiently extracting the desired linear filter has been clarified, targeting the codebook-based MU-MIMO. In the second embodiment, in order for a spatial multiplexing opportunity to be enhanced in the codebook-based MU-MIMO transmission, a case is targeted where the mobile station apparatus notifies not only the desired linear filter (called a first linear filter) but also a second linear filter to the base station apparatus. As in the first embodiment, communication is targeted in which a plurality of mobile station apparatuses (also referred to as the reception apparatus or the mobile terminal) having $N_r$ reception antennas is connected to the base station apparatus (also referred to as the transmission apparatus) having $N_t$ transmit antennas. The MU-MIMO transmission is targeted in which the maximum U=2 of mobile station apparatuses are spatially multiplexed in the same radio resource and in which the transmission of rank 1 is performed to each mobile station apparatus. However, as in the first embodiment, the spatial multiplexing number and the transmission rank number are not limited to what has been described above.

The configuration of the base station apparatus and the mobile station apparatus is basically the same as that of the apparatuses (see FIGS. 1 and 2) according to the first embodiment. The outline of signal processing in the entire system according to the second embodiment of the present invention will be described.

Figure 8:
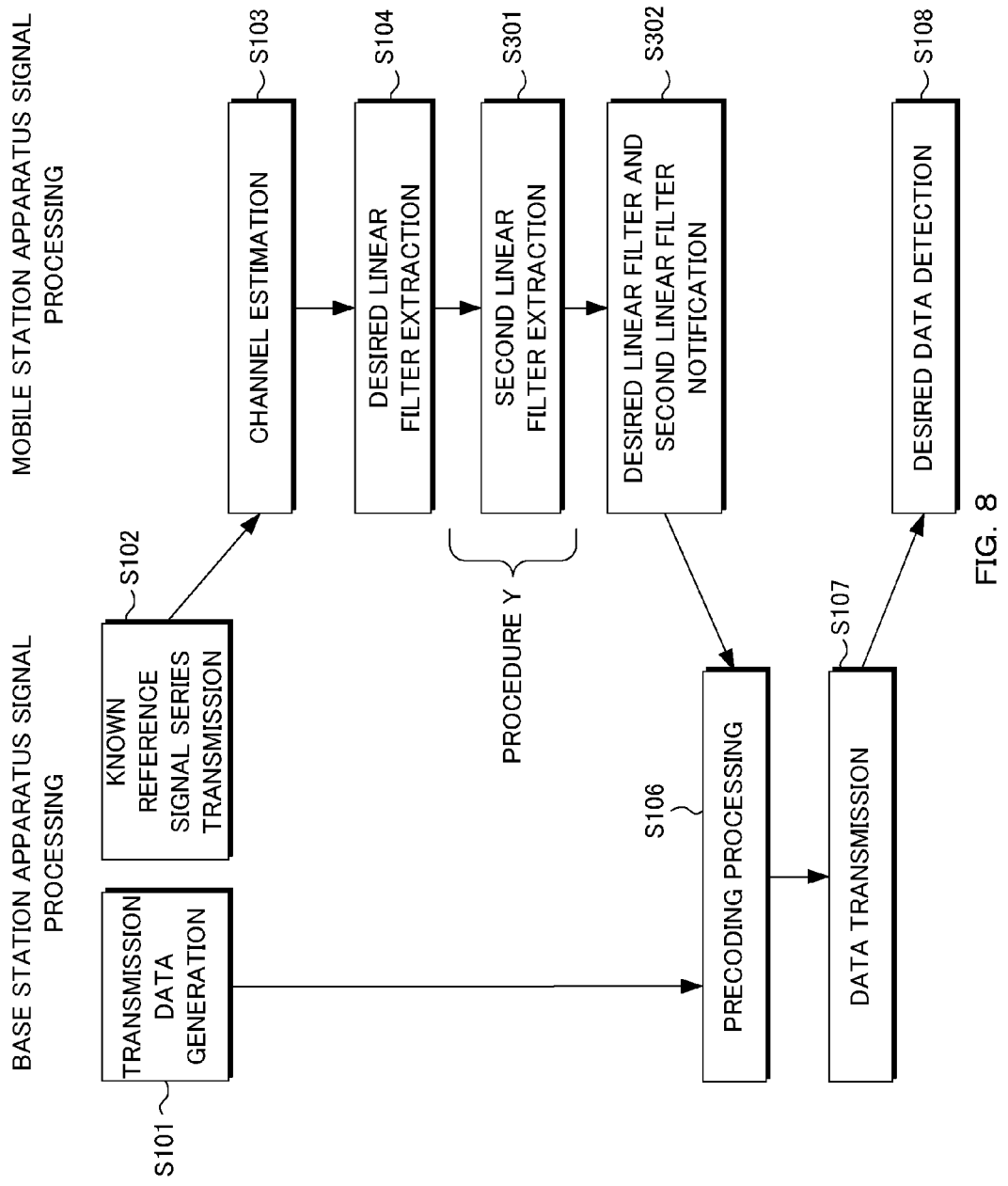
FIG. 8 A flowchart illustrating the outline of signal processing in the entire system according to a second embodiment of the present invention.

FIG. 8 is a flowchart illustrating the outline of signal processing in the entire system according to the second embodiment of the present invention. The signal processing is basically the same as in FIG. 3 but differs in that, in the mobile station apparatus, not only the first linear filter which is the desired linear filter but also the second linear filter is extracted (see a procedure Y). The base station apparatus generates the transmission data at the start (step S101), and transmits the known reference signal sequence to a plurality of mobile station apparatuses connected (step S102). Then, based on the received known reference signal sequence, the mobile station apparatus performs the channel estimation (step S103). Based on the estimated channel state information, the mobile station apparatus extracts the linear filter most desirable for its station from the known codebook (step S104), and further extracts the second linear filter from the known codebook (step S301). The mobile station apparatus notifies the number (index) of these linear filters to the base station apparatus (step S302).

The base station apparatus acquires the desired linear filter for each mobile station apparatus and the second linear filter, and based on the information, subjects the transmission data for each mobile station apparatus to transmission coding (precoding) (step S106). Data after the precoding is spatially multiplexed with the same radio resource, and is transmitted to a plurality of mobile station apparatuses connected (step S107). In the mobile station apparatus receiving the signal in which the data for a plurality of mobile station apparatuses is spatially multiplexed, based on the channel state information described above and the like, the desired data on its station is detected (step S108).

A method of notifying a linear filter as the second linear filter in order to enhance the spatial multiplexing opportunity in the MU-MIMO can be considered. As one of such a method, there is a method called a Best companion PMI scheme. In the following description, a method of categorizing a codebook targeting the Best companion PMI scheme will first be disclosed. In the Best companion PMI scheme, the mobile station apparatus notifies the base station apparatus of a linear filter (hereinafter referred to as a BPMI) most compatible with the desired linear filter of its station. In the downlink MU-MIMO, the BPMI is a linear filter that minimizes the reception SNR. This is because transmission data for other mobile station apparatuses is multiplied by a linear filter that minimizes the reception SNR of its station, and thus the transmission data for the other mobile station apparatuses is unlikely to be received as an interference signal. When $\arg\min_x (f(x))$ is assumed to be a function which selects x such that an evaluation function $f(x)$ is the minimum, a code $C_{B,u}$ that becomes the BPMI is given by formula below.

[Formula 4]

$$c_{B,u} = \underset{c_j; j=1 \sim C}{\operatorname{argmax}}(\|H_u c_j\|^2) \tag{4}$$

The mobile station apparatus notifies the base station apparatus of not only the desired linear filter but also the BPMI, and thus the Precoding unit 107 of the base station apparatus can perform such precoding as to spatially multiplex various mobile station apparatuses flexibly. However, there are problems that in order for the BPMI to be extracted, the amount of computation equal to that in the extraction of the desired linear filter is required for the mobile station apparatus, and, in order for the BPMI to be additionally notified to the base station apparatus, the amount of overhead is increased. In the following description, a method of efficiently extracting the BPMI in order to reduce the amount of computation required for extraction of the BPMI and the amount of overhead in the notification to the base station apparatus will be disclosed.

FIG. 9 is a table showing, in the LTE, the codebook of rank 1 transmission in which the base station apparatus has 4 transmission antennas. As shown in FIG. 9, in the codebook (which is assumed to be a second codebook) used for the rank 1 transmission in the transmission 4 antennas in the LTE, 16 linear filters are described. In FIG. 9, the codebook C=$\{c_1, c_2, c_2, \ldots, c_{16}\}$ is shown. In a conventional method, as in the extraction of the desired linear filter, the computation of formula (4) is performed on all linear filters described in the codebook, and the BPMI is calculated.

FIG. 10 is a table showing categorization relating to the extraction of the BPMI in the second codebook according to the second embodiment of the present invention. In the second embodiment, third categorization is defined at the start. The third categorization is generated by extracting linear filters kept orthogonal to the linear filters described in the second codebook. As a method of the third categorization, for example, categorization shown in FIG. 10 can be considered. The mobile station apparatus extracts the BPMI based on the third categorization. For example, when the desired linear filter is $C_5$, $C_5$ means that the BPMI is preferably extracted from $\{C_6, C_7, C_8\}$. The third categorization is determined based on a correlation between the linear filters described in the codebook. In other words, $C_5$ means to be orthogonal to $\{C_6, C_7, C_8\}$. Since the optimum BPMI is determined depending on the channel, $\{C_6, C_7, C_8\}$ orthogonal to $C_5$ do not always become the BPMI. However, since the possibility that the optimum BPMI of the mobile station apparatus where the desired linear filter is $C_5$ becomes $\{C_6, C_7, C_8\}$ is significantly high, the third categorization is sufficient for enhancing the spatial multiplexing opportunity in the downlink MU-MIMO.

In the third categorization, the number of candidates of the BPMI is 5 at the maximum. Since the codebook side of four transmission antennas is 16, when the BPMI is notified in a conventional method, the amount of notification information of 4 bits is necessary whereas, when the BPMI is determined based on the third categorization, the amount of notification information of 3 bits is sufficient, and thus it is also possible to facilitate the reduction of the overhead. A method of extracting the BPMI targeting the codebook of rank 1 transmission of 8 transmission antennas will now be described. The codebook for 8 transmission antennas is, as described in the first embodiment, a double-code book that is generated by the two codebooks $W_1$ and $W_2$. In the present embodiment, a method of extracting the BPMI from $C_1=\{c_{1,j}; j=1 \text{ to } 16\}$ associated with the $W_1$ and $C_2=\{c_{2,j}; j=1 \text{ to } 16\}$ associated with the $W_2$.

FIG. 11 is a table showing categorization (fourth categorization) relating to the extraction of the BPMI for the $W_1$ in the first codebook according to the second embodiment of the present invention. The $W_1$ will be described at the start. The desired linear filter is assumed to be previously extracted. As a method of extracting the desired linear filter, the method of the first embodiment may be used or the desired linear filter may be extracted by another method. The fourth categorization is defined at the start. When certain two linear filters are extracted from the $W_1$, there is a case where any one of the two linear filters is notified by the first mobile station apparatus and the other is notified by the second mobile station apparatus; even if the first mobile station apparatus and the second mobile station apparatus notify what type of $W_2$, by extracting a combination of the linear filters of the $W_1$ that easily maintains orthogonality between the first mobile station apparatus and the second mobile station apparatus, the fourth categorization is generated. As the fourth categorization, for example, categorization shown in FIG. 11 can be considered. The mobile station apparatus extracts the BPMI of the $W_1$ based on the desired linear filter extracted and the fourth categorization shown in FIG. 11. For example, since if the desired linear filter is $c_{1,1}$, the BPMI means to be any one of $\{c_{1,5}, c_{1,9}, c_{1,13}\}$, the filter, among $\{c_{1,5}, c_{1,9}, c_{1,13}\}$, that minimizes the reception SNR is notified as the BPMI to the base station apparatus.

FIG. 12 is a table showing categorization (fifth categorization) relating to the extraction of the BPMI for the $W_2$ in the first codebook according to the second embodiment of the present invention. The $W_2$ will then be described. With respect to the $W_2$, the desired linear filter is also assumed to be previously extracted. The $W_2$ is extracted based on the fifth categorization. When an arbitrary $W_1$ is assumed to be selected, by extracting a combination that maintains the orthogonality of the linear filter $W=W_1 W_2$ notified to the base station apparatus, the fifth categorization is generated. As the fifth categorization, for example, categorization shown in FIG. 12 can be considered. The mobile station apparatus extracts the BPMI of the $W_2$ based on the desired linear filter extracted and the fifth categorization shown in FIG. 12. For example, since if the desired linear filter is $c_{2,2}$, the BPMI means to be any one of $\{c_{2,4}, c_{2,8}, c_{2,12}, c_{2,16}\}$, the filter, among $\{c_{2,4}, c_{2,8}, c_{2,12}, c_{2,16}\}$, that minimizes the reception SNR is notified as the BPMI to the base station apparatus.

Since based on the above method, the reception SNR is preferably calculated on three linear filters for the $W_1$ and on four linear filters for the $W_2$, as compared with a conventional method where it is necessary to calculate the reception SNR on all linear filters described in the codebook, it is possible to significantly reduce the amount of computation. In the conventional method, the amount of information necessary for the feedback of the BPMI is 4 bits for each of the $W_1$ and the $W_2$ whereas, in the present scheme, 2 bits for each of the $W_1$ and the $W_2$ are satisfactory, and thus it is also possible to facilitate the reduction of the overhead.

The above method may be independently applied to the $W_1$ and the $W_2$. In other words, for the $W_1$, the BPMI may be extracted by the above method, and for the $W_2$, the BPMI may be conventionally extracted from all linear filters described in the codebook. However, in the above method, the BPMI may be found. In that case, the BPMI of the $W_2$ may be further performed based on sixth categorization on condition that the extraction of the BPMI of the $W_1$ is performed based on the fourth categorization. In the fifth categorization, an arbitrary $W_1$ is expected to be selected whereas, in the sixth categorization, the $W_1$ is assumed to be extracted based on the fourth categorization.

FIG. 13 is a table showing categorization (sixth categorization) relating to the extraction of the BPMI for the $W_2$ in the first codebook according to the second embodiment of the present invention. As the sixth categorization, for example, the sixth categorization shown in FIG. 13 can be considered.

When, for the $W_2$, the desired linear filter is $c_{2,1}$, and the BPMI is not extracted by the extraction based on the fifth categorization, the BPMI is further extracted from $\{c_{2,2}, c_{2,4}\}$. The number of candidate linear filters is increased to 6, thereby the amount of computation needed for the extraction and the amount of overhead needed for the feedback are increased; however, it is possible to enhance the accuracy of the BPMI itself and the spatial multiplexing opportunity.

Based on the above method, each mobile station apparatus extracts not only the desired linear filter but also the BPMI, and notifies them to the base station apparatus. The base station apparatus performs precoding based on the desired linear filter and the BPMI notified. The precoding is not limited; for example, the precoding may be performed based on the method described in the first embodiment; in that case, a combination of the mobile station apparatuses to be spatially multiplexed, that is, of the mobile station apparatuses constituting an equivalent channel matrix expressed in formula (1) (in the case of formula (1), the first mobile station apparatus and the second mobile station apparatus) is determined based on the BPMI, and thus it is possible to enhance the transmission quality and significantly enhance the spatial multiplexing opportunity.

For example, when two mobile station apparatuses of the first mobile station apparatus and the second mobile station apparatus are considered to be spatially multiplexed, a case where the first mobile station apparatus and the second mobile station apparatus are spatially multiplexed such that the desired linear filter notified by the first mobile station apparatus and the BPMI notified by the second mobile station apparatus agree with each other, or such that the BPMI notified by the first mobile station apparatus and the desired linear filter notified by the second mobile station apparatus agree with each other is possible to achieve more excellent transmission quality than a case where other mobile station apparatuses are spatially multiplexed. Further, all mobile station apparatuses need not notify the BPMI. When a mobile station apparatus that does not notify the BPMI is present, the base station apparatus may estimate, based on various types of categorization relating to the desired linear filter and the BPMI notified, the BPMI of the mobile station apparatus that does not notify the BPMI, and may perform, based on the estimated BPMI, the precoding.

The notified information may be not information indicating the linear filter itself that becomes the BPMI; but may be information relating to reception quality observed in the mobile station apparatus when the base station apparatus performs the precoding based on the BPMI. Since the signal processing in the base station apparatus other than the method of the precoding and the signal processing in the mobile station apparatus other than the method of extracting the BPMI are the same as in the first embodiment, their description will be omitted. The method of enhancing the spatial multiplexing opportunity of the MU-MIMO is not limited to the Best companion PMI scheme. A categorization method based on Worst companion PMI scheme will be simply described below.

The Worst companion PMI scheme is different from the Best companion PMI scheme, and is the scheme in which the mobile station apparatus notifies the base station apparatus of Worst companion PMI (hereinafter referred to as WPMI) representing a linear filter most incompatible with the desired linear filter of its station. In the downlink MU-MIMI, as the WPMI, for example, a linear filter that maximizes the reception SNR can be considered. This is because transmission data for other mobile station apparatuses is multiplied by a linear filter that maximizes the reception SNR of its station, and thus interference power from the other mobile station apparatuses is maximized. However, since the linear filter that maximizes the reception SNR is the desired linear filter (the first linear filter) itself, the second linear filter that becomes the WPMI other than the first linear filter is the linear filter that maximizes the reception SNR. Hence, the second linear filter is extracted based on formula (3). This means that it is possible to apply the first and second categorization for the extraction of the WPMI shown in FIGS. 6 and 7.

An example of a method of extracting the WPMI in the first codebook by applying the first categorization will be described. Although the mobile station apparatus performs, as in the extraction of the first linear filter, the extraction of the linear filter based on the flowchart of FIG. 5, the linear filters extracted in step S201 and step S204 are assumed to be the same as the first linear filter.

Then, in step S202 and step S205, the filter extracted as the first linear filter is omitted, and thereafter the linear filter is extracted by the same processing as when the first linear filter is extracted. With the processing described above, the mobile station apparatus can simply extract the WPMI. Since the WPMMI is extracted from three linear filters in the $W_1$ or four linear filters in the $W_2$, the amount of information needed for notification from the mobile station apparatus is the total of 4 bits alone, and thus it is possible to facilitate the reduction of the overhead.

The base station apparatus performs the precoding based on the first linear filter and the WPMI that is the second linear filter notified from the mobile station apparatus. When as the method of performing the precoding, for example, two mobile station apparatuses of the first mobile station apparatus and the second mobile station apparatus are considered to be spatially multiplexed, the first mobile station apparatus and the second mobile station apparatus that satisfy any one of a condition in which the desired linear filter notified by the first mobile station apparatus and the WPMI notified by the second mobile station apparatus agree with each other and a condition in which the WPMI notified by the first mobile station apparatus and the desired linear filter notified by the second mobile station apparatus agree with each other are prevented from being spatially multiplexed, and thus it is possible to significantly reduce the possibility that two mobile station apparatuses having a low orthogonality of the channel are spatially multiplexed. Hence, the method of notifying the WPMI is a technology that can reduce the possibility that wrong spatial multiplexing is performed, it is effective to improve the spectrum efficiency in the MU-MIMO transmission. The categorization in the codebook is performed on the extraction of the WPMI, and thus it is possible to enhance the transmission quality of the MU-MIMO without increasing the complexity of the mobile station apparatus and the amount of overhead.

As described above, in the codebook-based MU-MIMO, not only the desired linear filter but also the second linear filter are notified, and thus it is possible to enhance the spatial multiplexing opportunity and the like and improve the spectrum efficiency. As a rule for the extraction of the second linear filter, not only the reception SNR and the reception SINR that are used as the rule in the BPMI scheme and the WPMI scheme but also information associated with the reception quality such as the rank number can be considered; in any case, categorization is performed on the codebook, and thus it is possible to prevent the complexity of the mobile station apparatus and the increase in the amount of overhead. In the second embodiment, the method of efficiently extracting the second linear filter is disclosed, targeting a system in which the mobile station apparatus notifies the base station apparatus of not only the desired linear filter but also the second linear filter. In the present embodiment, it is possible to realize the extraction and the notification of the second linear filter with a small amount of computation and a small amount of overhead, and it is also possible to significantly facilitate, with the second linear filter, the improvement of the spectrum efficiency in the downlink MU-MIMO.

Third Embodiment

In the description of the first and second embodiments, the precoding in the base station apparatus is the linear precoding performed by the multiplication of the linear filter. However, in the codebook-based downlink MU-MIMO, only with the linear precoding, it is difficult to completely reduce the IUI, and the improvement of the spectrum efficiency is limited. Hence, in the base station apparatus, interference reduction processing for reducing the residual IUI is previously performed, and thus it is possible to improve the spectrum efficiency. An example of the interference reduction processing, Tomlinson-Harashima-precoding (THP) that is known as non-linear interference reduction processing or the like can be used. However, the interference reduction processing generally increases the burden on the base station apparatus such as an increase in the amount of computation. Hence, only the linear precoding is performed normally, in addition the interference reduction processing is performed only when the residual IUI is increased, with the result that it is possible to realize significant transmission performance improvement while minimizing the increase in the amount of computation.

However, there is a problem that the amount of computation in the base station apparatus is also increased due to estimate whether the residual IUI is increased. Hence, in the third embodiment, a method is targeted in which applying the categorization of the codebook described above to change precoding processing in the base station apparatus according to the categorization. Even in the third embodiment, as in the first and second embodiments, communication is targeted in which a plurality of mobile station apparatuses (also referred to as the reception apparatus or the mobile terminal) having $N_r$ reception antennas is connected to the base station apparatus (also referred to as the transmission apparatus) having $N_t$ transmission antennas. The MU-MIMO transmission is targeted in which the maximum U=2 of mobile station apparatuses are spatially multiplexed in the same radio resource and in which the transmission of rank 1 is performed on each mobile station apparatus. However, as in the first embodiment, the spatial multiplexing number and the transmission rank number are not limited to what has been described above. The configurations of the base station apparatus and the mobile station apparatus are shown in FIGS. 14 and 15, respectively.

As in the first and second embodiments, the mobile station apparatus notifies the base station apparatus of the desired linear filter. Here, the method of extracting the desired linear filter may be based on the method of the first embodiment or may be to simultaneously notify the second linear filter such as the BPMI as in the second embodiment. In the base station apparatus, when the precoding is performed based on the desired linear filter notified from each mobile station apparatus, based on the desired linear filter notified, the method of performing the precoding is switched.

Figure 14:
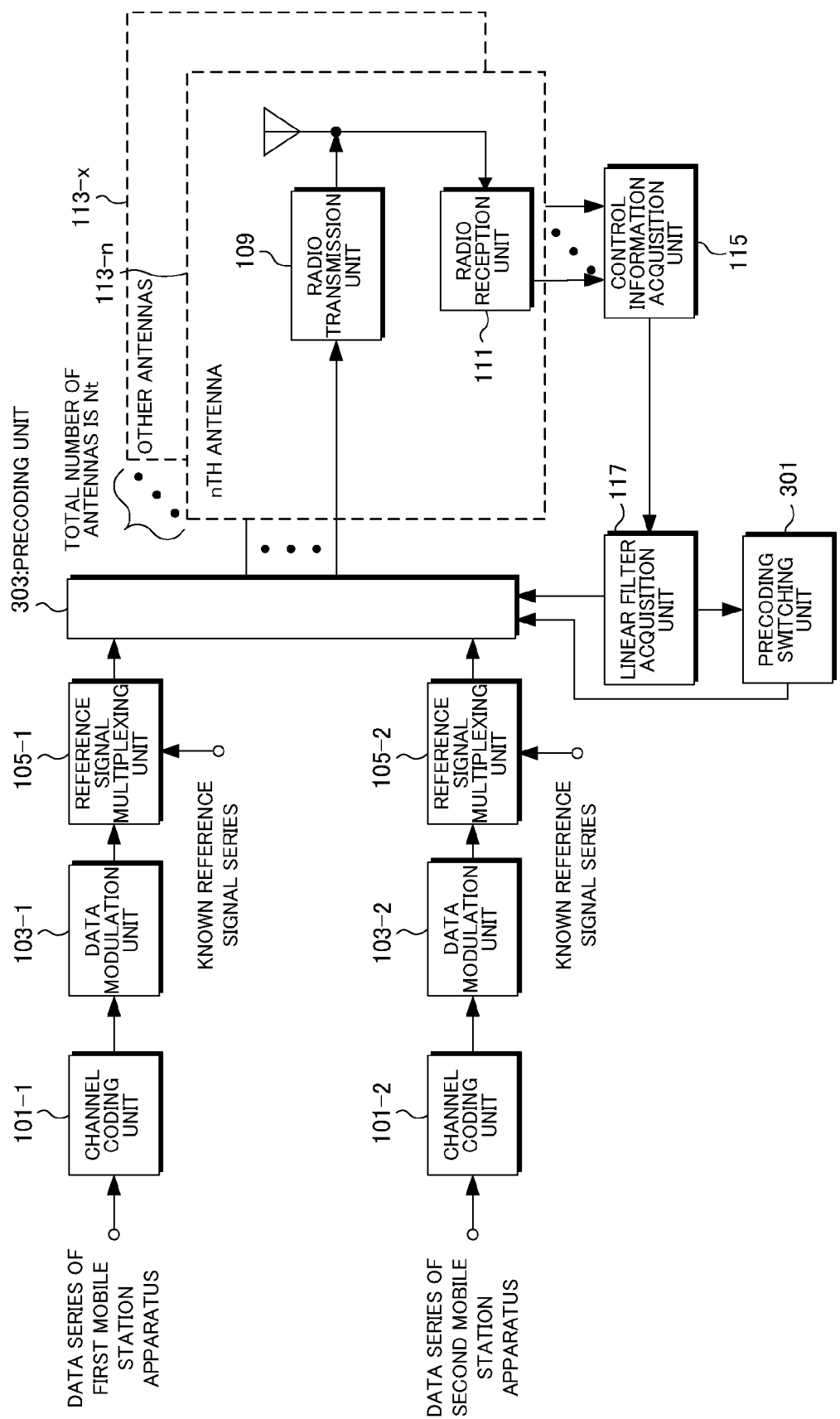
FIG. 14 A block diagram showing a configuration of a base station apparatus according to a third embodiment of the present invention.

FIG. 14 is a block diagram showing the configuration of a base station apparatus according to the third embodiment of the present invention. In addition to the configuration of the base station apparatus according to the first embodiment, a Precoding switching unit 301 is added. In the Precoding switching unit 301, based on the desired linear filter notified from the mobile station apparatus and seventh categorization or eighth categorization, which will be described later, whether or not interference reduction is performed is switched. In a Precoding unit 303, based on a control signal from the Precoding switching unit 301, the linear precoding based on the multiplication of the linear filter is only performed on the transmission data or the interference reduction is performed in addition to the linear precoding. Since signal processing performed in the configuration of the apparatus other than the Precoding unit 303 and the Precoding switching unit 301 is the same as in the base station apparatus (see FIG. 1) of the first embodiment, its description will be omitted.

Figure 15:
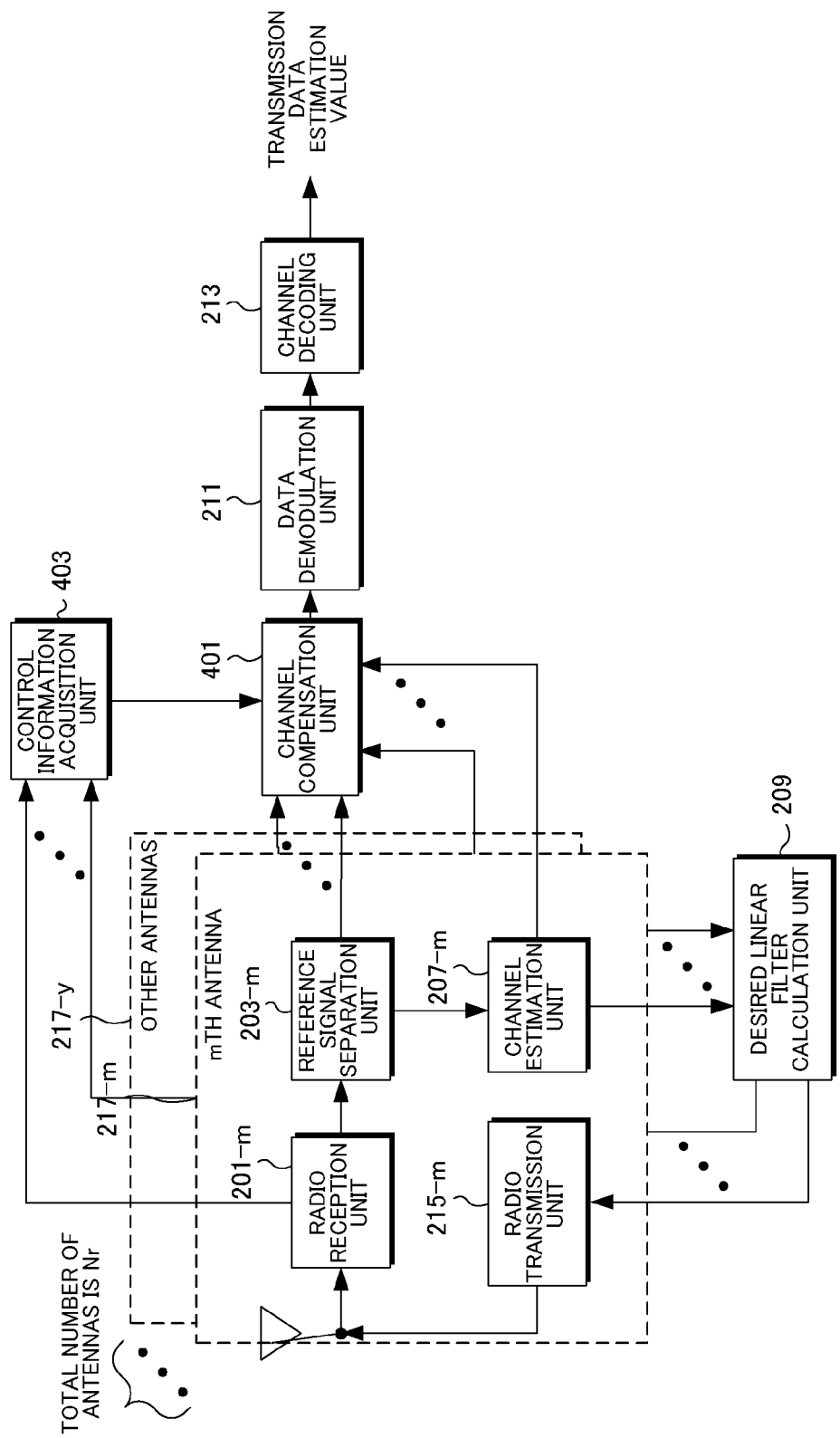
FIG. 15 A block diagram showing a configuration of a mobile station apparatus according to the third embodiment of the present invention.

FIG. 15 is a block diagram showing the configuration of a mobile station apparatus according to the third embodiment of the present invention. A description will be given with reference to FIG. 15. The configuration is basically the same as that of the mobile station apparatus (see FIG. 2) according to the first embodiment, and differs in that signal processing in a channel compensation unit 401 and a control information acquisition unit 403. In the third embodiment, in the Precoding unit 303 of the base station apparatus, the interference reduction is performed, and in that case, modulo computation may be performed to reduce the increase of transmit power. In order to detect the desired signal from transmission data on which the precoding including the modulo computation has been performed, it is necessary to perform the modulo computation in the side of a receiver.

Hence, in the channel compensation unit 401 of the mobile station apparatus according to the third embodiment, the same channel compensation as in the first embodiment is performed, then the same modulo computation as that performed in the precoding of the base station apparatus is performed, and thus an output of the channel compensation unit 401 is generated. Whether or not the modulo computation is actually performed may be controlled on the basis that the base station apparatus notifies control information associated with whether or not the modulo computation is performed, and the control information acquisition unit 403 inputs this control information to the channel compensation unit 401; the mobile station apparatus may singly estimate whether or not the modulo computation is present; or the modulo computation may be controlled to be constantly performed regardless of the type of precoding performed by the base station apparatus. Since signal processing in the channel compensation unit 401 and signal processing in the configuration of the mobile station apparatus other than the control information acquisition unit 403 are the same as those performed in the mobile station apparatus (see FIG. 2) according to the first embodiment, their description will be omitted.

A description will be given targeting the first codebook. That is, the number of transmission antennas in the base station apparatus is 4, and each mobile station apparatus performs the transmission of rank 1. The linear filters described in the codebook have a different correlation value. Hence, in the third embodiment, based on correlation vales among the linear filters notified from each of the mobile station apparatuses, whether or not the interference reduction processing is performed is determined. Therefore, the seventh categorization is generated based on large and small of the correlation values among the linear filters.

FIG. 16 is a table showing categorization (seventh categorization) associated with the interference reduction processing in the second codebook according to the third embodiment of the present invention. For example, when the first mobile station apparatus which notifies $C_1$ as the desired linear filter is spatially multiplexed with the second mobile station apparatus which notifies $C_5$ as the desired linear filter, since it is found from the seventh categorization that the combination of $C_1$ and $C_5$ is a combination which increases the residual IUI, the interference reduction processing is performed in the base station apparatus. The signal processing in the Precoding unit 303 when the interference reduction processing is performed will be described. As in the first embodiment, in the Precoding unit 303, from the desired linear filter $\{W_1, W_2\}$ notified from each mobile station apparatus, an apparent channel matrix $H_{eff}$ between each mobile station apparatus and the base station apparatus is defined as formula (1).

The linear filter $W_{eff}$ is generated from the channel matrix $H_{eff}$ given by formula (1). Although the linear filter $W_{eff}$ used in the first embodiment is a matrix that transforms the channel matrix $H_{eff}$ into a unit matrix, the linear filter $W_{eff}$ used in the present embodiment is a matrix that transforms the channel matrix $H_{eff}$ into a lower triangular matrix. Such a matrix can be determined by applying QR decomposition to the adjoint matrix $H_{eff}^H$ of the $H_{eff}$. In other words, when the QR decomposition is performed such that $H_{eff}^H = QR$ (Q is a unitary matrix, R is an upper triangular matrix), Q becomes the linear filter $W_{eff}$. Since the following formula exists,

[Formula 5]

$$H_{eff}Q = R^H = \begin{pmatrix} r_{1,1} & 0 & 0 & \cdots & 0 \\ r_{2,1} & r_{2,2} & 0 & \cdots & 0 \\ 0 & 0 & 0 & \cdots & 0 \\ \vdots & \vdots & & \ddots & \\ 0 & 0 & 0 & & 0 \end{pmatrix} \quad (5)$$

a matrix ($N_r \times 2$) obtained by extracting the first to second column vectors precisely becomes the linear filter $W_{eff}$.

Here, it is considered that the base station apparatus transmits, as a transmission signal vector, a vector $W_{eff}d$ obtained by multiplying, as the linear filter $W_{eff}$, a transmission vector by the unitary matrix Q satisfying formula (5). When a reception signal received by the mth reception antenna of the uth mobile station apparatus is assumed to be $\{r_{u,m}; u=1 \text{ to } 2, m=1 \text{ to } N_r\}$; in the uth mobile station apparatus, the reception signal vector $r_u = [r_{u,1}, \ldots, r_{u,Nr}]^T$ is expressed by formula below.

[Formula 6]

$$r_u = H_u W_{eff} d + n_u \quad (6)$$

where $n_u$ is a noise vector. In each mobile station apparatus, the reception signal vector is multiplied by a reception filter $Wr_u$ which maximizes the reception SNR of the desired signal. When the transmission of rank 1 is performed, the reception filter $Wr_u$ which maximizes the reception SNR is a row vector of ($N_r \times 1$) expressed by $(H_u W_u)^H$. A detection output multiplied by $Wr_u = (H_u W_u)^H$ is assumed to be $\hat{d}_u$. A detection output vector $\hat{d} = [\hat{d}_1, \hat{d}_2]^T$ obtained by summarizing the detection outputs of the first and second mobile station apparatuses is given by formula below.

[Formula 7]

$$\hat{d} = \begin{pmatrix} (H_1 W_1)^H r_1 \\ (H_2 W_2)^H r_2 \end{pmatrix} \quad (7)$$

$$= \begin{pmatrix} W_1^H H_1^H H_1 \\ W_2^H H_2^H H_2 \end{pmatrix} W_{eff} d$$

For simplicity, a noise term is omitted.

Each mobile station apparatus notifies the base station apparatus of the transmission linear filter $W_U$ that can maximize the reception SNR of a signal for the station. The transmission linear filter described above is a unique vector (here, which is assumed to be $U_{u,max}$) corresponding to a maximum unique value (here, which is assumed to be $\lambda_{u,max}$) among the unique vectors included in a matrix $H_u^H H_u$ calculated from a channel matrix $H_u$ between the base station apparatus and the uth mobile station apparatus. In the present embodiment, the linear filter notified by the mobile station apparatus to the base station apparatus is limited to the linear filters described in the codebook; it is not possible to notify a unique vector itself. However, if the codebook size is sufficiently large, the base station apparatus can grasp the linear filter having a sufficient correlation with the unique vector. When the linear filter $W_u$ notified by the mobile station apparatus to the base station apparatus satisfies $W_U = U_{u,max}$,

[Formula 8]

$$W_u^H H_u^H H_u = \lambda_{u,max} W_u^H \quad (8)$$

holds true. Formula 8 is substituted into formula (7), and thus the following formula is given.

[Formula 9]

$$\hat{d} = \begin{pmatrix} \lambda_{1,max} & 0 \\ 0 & \lambda_{2,max} \end{pmatrix} \begin{pmatrix} W_1^H \\ W_2^H \end{pmatrix} W_{eff} \begin{pmatrix} d_1 \\ d_2 \end{pmatrix} \quad (9)$$

$$= \begin{pmatrix} \lambda_{1,max} & 0 \\ 0 & \lambda_{2,max} \end{pmatrix} \begin{pmatrix} r_{1,1} & 0 \\ r_{2,1} & r_{2,2} \end{pmatrix} \begin{pmatrix} d_1 \\ d_2 \end{pmatrix}$$

It is found from Formula 9 that the first mobile station apparatus can receive only the signal for its station, whereas the second mobile station apparatus receives the signal which includes the signal for the first mobile station apparatus as interference. Hence, in the Precoding unit 303, the interference signal observed by the second mobile station apparatus is previously subtracted.

In the Precoding unit 303, based on a modulation symbol d, $H_{eff}$ and $W_{eff}$ the interference reduction is performed. Specifically, signal processing as indicated in formula below is performed on a transmission signal $d_2$ for the second mobile station apparatus, and thus a transmission signal $x_2$ for the second mobile station apparatus is newly calculated.

[Formula 10]

$$x_2 = d_2 - \frac{r_{2,1}}{r_{2,2}} d_1 \quad (10)$$

It is found that the signal $x_2$ indicated in formula (10) is transmitted as the transmission signal for the second mobile station apparatus instead of the $d_2$, and thus it is possible to make the second mobile station apparatus also receive only the desired signal.

The interference reduction processing described above is performed before the multiplication of the linear filter $W_{eff}$, and thus it is possible to perform transmission without giving interference with the mobile station apparatus. However, depending on the state of the channel state information $H_{eff}$, the size of the $x_2$ is significantly larger than the $d_2$, and thus an extremely large amount of transmit power can be needed. In that case, it is necessary to perform non-linear signal processing that is called the modulo computation on the $x_2$.

The modulo computation $Mod_M(x)$ controls the output of a certain input x to be higher than $-M$ but equal to or less than M. Here, M is called a modulo width, and is set according to the modulation scheme of an input signal or the like. For example, when a QPSK modulation signal is input, a setting is made such that M=sqrt (2). When the modulo computation is actually performed on the signal $x_2$ indicated in formula (10), the output is given by formula below.

[Formula 11]

$$Mod_M(x_2) = d_2 - \frac{r_{2,1}}{r_{2,2}} d_1 + 2Mz \quad (10\text{-}1)$$

where z is a complex number where each of the real and imaginary parts is an integer, and each of the real and imaginary parts in the right-hand side of formula (10-1) is selected to be higher than $-M$ but equal to or less than M. This z is called an equivalent expression of the modulo computation. The modulo computation is performed, and thus it is possible to make the size of the $x_2$ always constant regardless of the state of the channel state information $H_{eff}$. The formula (10-1) can be expressed as the following formula.

[Formula 12]

$$Mod_M(x_2) = \\ x_2 - 2M \cdot \text{floor}\left(\frac{Re(x_2)}{2M} + \frac{1}{2}\right) - j2M \cdot \text{floor}\left(\left(\frac{Im(x_2)}{2M} + \frac{1}{2}\right)\right) \quad (10\text{-}2)$$

where floor (x) is a function that returns the maximum integer which does not exceed a real number x, and is also called a floor function. Re(c) and Im(c) return a real number and an imaginary number of a complex number c, respectively.

The $x_2$ (including the modulo computation) calculated as described above is output from a non-linear signal processing unit (not shown) as a transmission symbol for the second mobile station apparatus. A transmission symbol for the first mobile station apparatus is not particularly subjected to signal processing. The transmission symbol on which the interference reduction described above is performed is multiplied by the linear filter $W_{eff}Q$, and thereafter an output s of the Precoding unit 303 is output.

The signal processing in the Precoding unit 303 when the mobile station apparatuses which notify, as the desired linear filter, the linear filter generating the large residual IUI are spatially multiplexed by the seventh categorization has been described above. When the mobile station apparatuses which notify, as the desired linear filter, the linear filter that does not generate the residual IUI are spatially multiplexed in the seventh categorization (for example, when, if the first mobile station apparatus notifies $c_1$ and the second linear filter notifies $c_{11}$ as the desired linear filter, both are spatially multiplexed), in formula (9), $r_{2,1}$ is 0, and thus it is not necessary to perform the interference reduction in the Precoding unit 303.

The categorization in the codebook associated with the interference reduction processing in the base station apparatus with four transmission antennas has been described above. In the seventh categorization, it is found that the index of the linear filter where the residual IUI is decreased agrees with the index of the linear filter that is a candidate of the BPMI in the third categorization (see FIG. 10), and thus the index of the linear filter where the residual IUI is increased is the linear filter that is not a candidate of the BPMI. The same is true for the codebook for 8 transmission antennas. That is, in the four to sixth categorization, the linear filter that is a candidate of the BPMI is the linear filter that can decrease the residual IUI; and the linear filter that is not a candidate of the BPMI is the linear filter that increases the residual IUI. Hence, whether or not the linear filter is a candidate of the BPMI in the four to sixth categorization allows the new eighth categorization (not shown) to be generated and also allows whether or not the interference reduction is performed in the base station apparatus to be controlled according to the eighth categorization.

The seventh and eighth categorization categorize into two values in which whether the correlation between the linear filter is high or low, that is, whether the residual IUI after the precoding is increased or decreased. In the third embodiment, it is not necessary to limit the categorization into two values, and the categorization allows into three values or more according to the magnitude of the residual IUI. In that case, according to the magnitude of the residual IUI in each categorization, the Precoding switching unit 301 of the base station apparatus may control so as to adaptably switch, for example, whether the Precoding unit 303 performs only the linear precoding, the interference reduction or the interference reduction with non-linear computation; or whether the transmission linear filter generated by the Precoding unit 303 of the base station apparatus is based on a ZF criterion or based on a MMSE criterion.

In the third categorization, the case is targeted where the method that the precoding in the base station apparatus is switched according to the categorization in the codebook. Since it is possible to determine whether or not the interference reduction is performed based on the linear filter notified from the mobile station apparatus, it is possible to flexibly switch the precoding method without significantly increasing the amount of computation, and to facilitate the enhancement of the spectrum efficiency over the entire system.

Common in all Embodiments

Variations

Although the embodiments of this invention have been described above in detail with reference to the drawings, the specific configuration is not limited to the embodiments, and designs and the like without departing from the spirit of this invention are also included in the scope of claims.

Programs running in the mobile station apparatus and the base station apparatus according to the present invention are programs (programs which make a computer function) which control a CPU and the like so as to realize the functions of the above embodiments according to the present invention. Information handled in these apparatuses is temporarily stored in a RAM at the time of processing, is thereafter stored in various types of ROM and HDD, is read by the CPU as necessary and is modified and written. A recording medium storing the programs may be a semiconductor medium (for example, a ROM or a nonvolatile memory card), an optical recording medium (for example, a DVD, an MO, an MD, a CD or a BD), a magnetic recording medium (for example, a magnetic tape or a flexible disc) or the like. A program loaded is performed to realize the functions of the embodiments described above; moreover, based on an instruction of the program, processing is performed together with an operating system, other application programs or the like, and thus the functions of the present invention may be realized.

When the programs are distributed in the market, the programs can be stored in a portable recording medium and be distributed or can be transferred to a server computer connected through a network such as the internet. In this case, a storage apparatus in the server computer is also included in the present invention. Part or all of the mobile station apparatus and the base station apparatus in the embodiments described above may be typically realized as an LSI, which is an integrated circuit. Each functional block of the mobile station apparatus and the base station apparatus may be individually formed into a processor; or part of all of them may be integrated and formed into a processor. A method of formation into an integrated circuit is not limited to an LSI; it may be realized by a dedicated circuit or a general-purpose processor. If advancement of semiconductor technology produces a technology for formation into an integrated circuit as a replacement for an LSI, the integrated circuit by such a technology can be used.

Although the embodiments of this invention have been described above in detail with reference to the drawings, the specific configuration is not limited to the embodiments, and designs and the like without departing from the spirit of this invention are also included in the scope of claims.

DESCRIPTION OF SYMBOLS

101-1, 101-2 channel coding unit
103-1, 103-2 data modulation unit
105-1, 105-2 reference signal multiplexing unit
107 Precoding unit
201-$m$, 201-1 to 201-$N_r$, 201 radio reception unit
203-$m$, 203-1 to 203-$N_r$, 203 reference signal separation unit
205 channel compensation unit
207-$m$, 207-1 to 207-$N_r$, 207 channel estimation unit
209 desired linear filter calculation unit
211 data demodulation unit
213 channel decoding unit
301 Precoding switching unit
303 Precoding unit
401 channel compensation unit
403 control information acquisition unit

The invention claimed is:

1. A wireless transmission apparatus that includes a plurality of transmission antennas, that performs precoding on a data signal for each of a plurality of reception apparatuses and that spatially multiplexes and transmits the signal after said precoding, the wireless transmission apparatus comprising:
   A memory having instructions stored thereon executed by a processor to perform:
   sharing a codebook describing a plurality of linear filters associated with each other with each of said reception apparatuses, and
   precoding on the data signal for each of said reception apparatuses, based on a first linear filter that is extracted from said codebook in each of said reception apparatuses based on said association and that is notified from each of said reception apparatuses;
   wherein said first linear filter maximizes any one of a reception signal-to-noise power ratio, a reception signal-to-interference plus noise power ratio, and a communication capacity of each of said reception apparatuses.

2. The wireless transmission apparatus of claim 1, wherein each of said linear filters is associated with the others in said codebook based on orthogonality or a correlation value.

3. The wireless transmission apparatus of claim 1, wherein each of said linear filters is associated with the others in said codebook by a matrix having a row vector formed with information associated with linear filters having a high correlation value and a column vector formed with information associated with linear filters having a low correlation value or no correlation.

4. The wireless transmission apparatus of claim 3, wherein in a plurality of rows and columns of said matrix, information associated with each of said linear filters is described.

5. The wireless transmission apparatus of claim 1, wherein based on the association of said plurality of linear filters, a method of said precoding is determined.

6. The wireless transmission apparatus of claim 5, wherein said precoding is non-linear computation processing including a modulo computation.

7. A wireless reception apparatus that includes at least one reception antenna and that receives a spatially multiplexed signal from a wireless transmission apparatus, the wireless reception apparatus comprising:
   A memory having instructions stored thereon executed by a processor to perform:
   sharing a codebook describing a plurality of linear filters associated with each other with said wireless transmission apparatus, and
   extracting a first linear filter from said codebook, based on said association, and
   notifying the extracted first linear filter to said wireless transmission apparatus; wherein
   said first linear filter maximizes any one of a reception signal-to-noise power ratio, a reception signal-to-interference plus noise power ratio and a communication capacity of said wireless transmission apparatus.

8. The wireless reception apparatus of claim 7, wherein each of said linear filters is associated with the others in said codebook based on orthogonality or a correlation value.

9. The wireless reception apparatus of claim 7, wherein each of said linear filters is associated with the others in said codebook by a matrix having a row vector formed with information associated with linear filters having a high correlation value and a column vector formed with information associated with linear filters having a low correlation value or no correlation.

10. The wireless reception apparatus of claim 9, wherein in a plurality of rows and columns of said matrix, information associated with each of said linear filters is described.

11. The wireless reception apparatus of claim 7, wherein based on said association, a second linear filter associated with said first linear filter is extracted from said codebook, and said first linear filter and said second linear filter are notified to said wireless transmission apparatus.

12. The wireless reception apparatus of claim 11, wherein said first linear filter and said second linear filter are associated with each other based on orthogonality or a correlation value.

13. The wireless reception apparatus of claim 11, wherein said second linear filter is associated with a plurality of linear filters.

14. The wireless reception apparatus of claim 11, wherein reception quality associated with said second linear filter is different from reception quality associated with said first linear filter.

15. The wireless reception apparatus of claim 11, wherein said second linear filter minimizes any one of a reception signal-to-noise power ratio, a reception signal-to-interference plus noise power ratio and a communication capacity of said reception apparatus.

16. The wireless reception apparatus of claim 11, wherein said second linear filter has a high correlation value with said first linear filter.

17. An integrated circuit that is mounted on a wireless transmission apparatus including a plurality of transmission antennas and that makes said wireless transmission apparatus perform a plurality of functions, the integrated circuit makes said wireless transmission apparatus perform a series of functions, the integrated circuit comprising:

A memory having instructions stored thereon executed by a processor to perform:

a function of performing precoding on a data signal for each of a plurality of reception apparatuses and of spatially multiplexing and transmitting the signal after said precoding;

a function of sharing, with each of said reception apparatuses, a codebook describing a plurality of linear filters associated with each other; and a function of performing, based on a first linear filter that is extracted from said codebook in each of said reception apparatuses based on said association and that is notified from each of said reception apparatuses, the precoding on each data signal for each of said reception apparatus; wherein said first linear filter maximizes any one of a reception signal-to-noise power ratio, a reception signal-to-interference plus noise power ratio and a communication capacity of each of said reception apparatuses.

* * * * *